US006466958B1

(12) United States Patent
Van Wechel et al.

(10) Patent No.: US 6,466,958 B1
(45) Date of Patent: Oct. 15, 2002

(54) PARALLEL FREQUENCY SEARCHING IN AN ACQUISITION CORRELATOR

(75) Inventors: Robert J. Van Wechel, Yorba Linda; Michael F. McKenney, Anaheim, both of CA (US)

(73) Assignee: Interstate Electronics Corporation, a division of L3 Communications Corporation, Anaheim, CA (US)

(*) Notice: Subject to any disclaimer, the term of this patent is extended or adjusted under 35 U.S.C. 154(b) by 28 days.

(21) Appl. No.: 09/659,517

(22) Filed: Sep. 12, 2000

(51) Int. Cl.$^7$ .......................... G06F 17/15; H04B 15/10
(52) U.S. Cl. ..................... 708/422; 375/142; 375/143; 375/150; 375/152
(58) Field of Search ....................... 708/422; 375/142, 375/143, 150, 152

(56) References Cited

U.S. PATENT DOCUMENTS

| | | | |
|---|---|---|---|
| 4,104,631 A | 8/1978 | Weigle et al. | |
| 4,231,102 A | 10/1980 | Barr et al. | |
| 4,747,067 A | 5/1988 | Jagodnik, Jr. et al. | |
| 4,896,287 A | 1/1990 | O'Donnell et al. | |
| 4,945,505 A | 7/1990 | Wiener et al. | |
| 4,972,361 A | 11/1990 | Rader | |
| 5,093,801 A | 3/1992 | White et al. | |
| 5,170,415 A | 12/1992 | Yoshida et al. | |
| 5,237,587 A | 8/1993 | Schoolcraft | |
| 5,414,728 A | * 5/1995 | Zehavi | ........... 375/142 |
| 5,414,729 A | 5/1995 | Fenton | |

(List continued on next page.)

OTHER PUBLICATIONS

Ray Andraka, *A Survey of CORDIC Algorithms For FPGA Based Computers*, Proceedings of the 1998 ACM/SIGDA Sixth International Symposium on Field Programmable Gate Arrays, pp 191–200, Feb. 22–24, 1998.

Bob Van Wechel, *Enhanced GPS For Combat Systems*, Final Report WL–TR–95–1146, pp. 1–119 (Interstate Electronics Corporation 1995).
Ed. F. Deprettere, et al., *Pipelined CORDIC Architectures For Fast VLSI Filtering And Array Processing*, Proc. IEEE ICASSP 1984, pp. 41A.6.1–41A.6.4.
Alvin M. Despain, *Fourier Transform Computers Using CORDIC Iterations*, c23 IEEE Transactions On Computers 993–1001, (Oct. 1974).
PCT International Search Report.
D. Leimer, "Sequential Detection Test for GPS C/A Acquisiton," Magnavox MRL Reference No. MX–TM–3166–75 (Feb. 4, 1975).
Abraham Wald, "Sequential Analysis," John Wiley & Sons, Inc., (1947).
"Sequential Analysis of Statistical Data: Applications," Authorship and Date unknown at this time.
U.S. Ser. No. 09/659,647 Sept. 12, 2000 Van Wechel.

*Primary Examiner*—Tan V. Mai
(74) *Attorney, Agent, or Firm*—Knobbe, Martens, Olson & Bear, LLP

(57) ABSTRACT

An apparatus and method allow receivers to quickly acquire a pseudorandom noise signal. A receiver advantageously detects frequency shifts using a compact parallel process hardware implementation of a Discrete Fourier Transform (DFT). The simultaneous detection of multiple frequencies allows the receiver to search the frequency range of the transmitted signal in larger increments of frequency, thereby increasing the speed of acquisition. One receiver does not use coherent integration before computation of the transform and advantageously maintains a flat frequency response. The flat frequency response of the DFT circuit enables searching of multiple frequency offsets without CPU intensive processing to compensate for frequency response variations. A receiver can include a Doppler correction circuit, which permits correlation data with frequency shift in the code to be non-coherently integrated among relatively fewer addresses or tap positions in memory.

37 Claims, 19 Drawing Sheets

U.S. PATENT DOCUMENTS

| | | |
|---|---|---|
| 5,574,454 A | 11/1996 | Kurihara et al. |
| 5,646,626 A | 7/1997 | Willis |
| 5,897,605 A | 4/1999 | Kohli et al. |
| 5,901,171 A | 5/1999 | Kohli et al. |
| 5,968,112 A | 10/1999 | Kirschenbaum et al. |
| 5,974,080 A | 10/1999 | Papasakellariou |
| 6,005,889 A | 12/1999 | Chung et al. |
| 6,028,883 A | 2/2000 | Tiemann et al. |
| 6,111,911 A | 8/2000 | Sanderford et al. |
| 6,278,403 B1 | 8/2001 | Peng et al. |
| 6,298,083 B1 | 10/2001 | Westcott et al. |
| 6,335,947 B1 * | 1/2002 | Lattard et al. ............... 375/142 |
| 6,363,108 B1 * | 3/2002 | Agrawal et al. ............ 375/152 |

\* cited by examiner

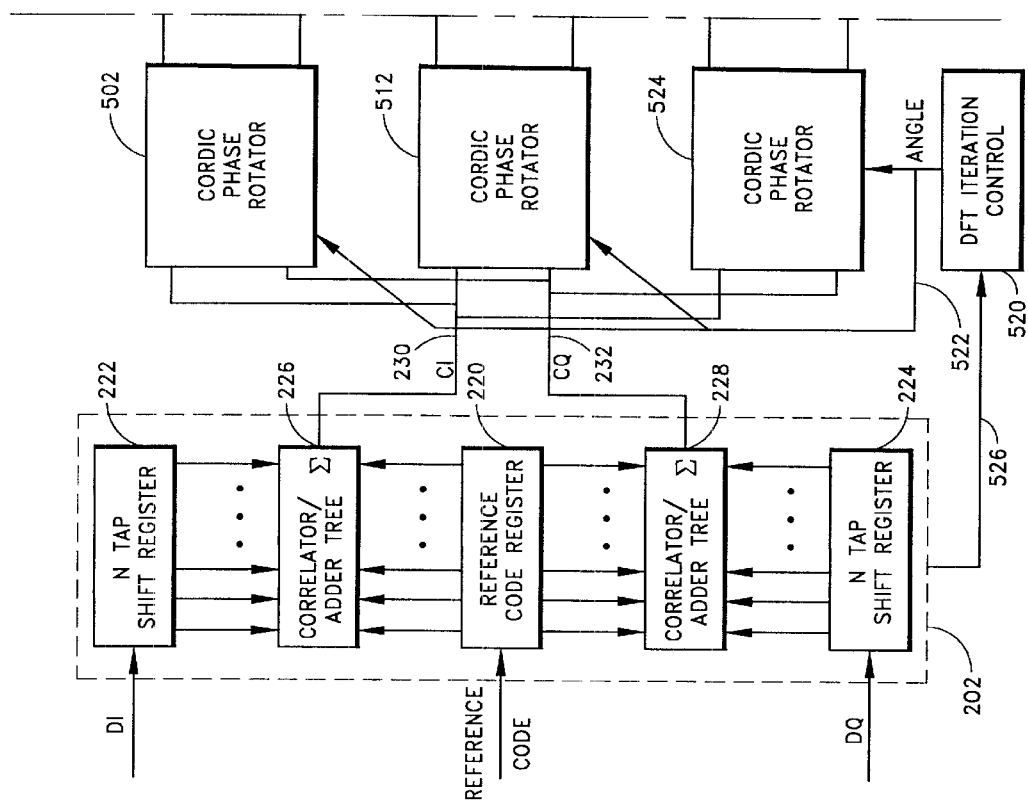

PARALLEL FREQUENCY SEARCHING IN AN ACQUISITION CORRELATOR

BACKGROUND OF THE INVENTION

1. Field of the Invention

The present invention is generally related to a method and apparatus for acquiring a pseudorandom noise (PN) signal in a receiver. In particular, the present invention relates to methods and apparatus for the fast acquisition and fast correlation of a pseudorandom noise (PN) signal in a Global Positioning System (GPS) receiver.

2. Description of the Related Art

The Global Positioning System (GPS) Operational Constellation nominally consists of 24 earth orbiting satellites. Each satellite radiates a spread spectrum, pseudorandom noise (PN) signal indicating the satellite's position and time. A GPS receiver tuned to receive the signals from the satellites can compute the distance to the satellites and calculate the receiver's position, velocity, and time. The receiver calculates the distance to a satellite by multiplying the propagation rate of the satellite's radio signal (the speed of light) by the time it took the signal to travel from the satellite to the receiver.

Each satellite transmits two carrier signals referred to as L1 and L2. L1 operates at a frequency of 1.57542 GHz and L2 operates at a frequency of 1.22760 GHz. Multiple binary codes induce phase modulation upon the L1 and L2 carrier signals. Each satellite in the GPS Operational Constellation transmits a unique code over the L1 and L2 carrier signals. One of the phase-modulated signals is C/A Code (Coarse Acquisition). Presently, 32 codes are defined for the C/A Code. A satellite's C/A Code phase modulates the L1 carrier over a 1.023 MHz bandwidth. The C/A Code is a repeating 1023 bit sequence. At 1023 bits and 1.023 MHz, the C/A Code repeats every millisecond. The C/A Code forms the basis for the Standard Positioning Service (SPS) used by civilians.

Another phase-modulated signal is the P-Code (Precise). The P-Code is similar to the C/A Code in that it is a PN sequence which phase modulates a carrier signal. The P-Code modulates both the L1 and the L2 signals at a rate of 10.23 MHz. In an Anti-Spoofing mode, the P-Code is encrypted to produce the Y-Code to restrict access to users with the encryption key. The P-Code forms the basis for the military's Precise Positioning Service (PPS). One reason the PPS is more accurate than the SPS is that the PPS relies on two signals, L1 and the L2, which operate at different frequencies. Because the L1 and L2 signals have different frequencies, a receiver using both signals can compensate for the distortion in propagation delay induced by ionospheric conditions. In 1998 and 1999, the U.S. Government announced plans to add a second civilian signal to the existing L2 carrier signal and add a third civilian signal to a third carrier at 1.17645 GHz.

In a GPS receiver, "acquiring" a satellite occurs when the GPS receiver acquires the signal of a satellite. The GPS receiver acquires the satellite by matching a code received by the GPS receiver to a code defined for the satellite. This matching is termed "correlation." Acquiring a satellite as quickly as possible is a highly desirable characteristic, particularly when the GPS receiver operates in an environment featuring interference or obstructions to radio reception. An example is a car moving in canyons, by tall buildings, over bridges, in tunnels, in parking structures, and the like. Under these conditions, reception from a satellite can be sporadic. If the GPS receiver cannot acquire or reacquire a satellite quickly, the GPS system may not be able to provide the user with useful information. To compensate for intermittent reception of the satellite signals, many automotive GPS systems include supplemental inertial navigation systems such as gyroscopes, which increases the cost of the system.

One factor that increases the acquisition time of a system is a frequency error or variance between the frequency transmitted by the satellite and the frequency expected by the GPS receiver. When the frequency received from the satellite varies from the frequency expected by the system, the amount of correlation between the transmitted satellite code and the expected satellite code decreases. A severe reduction in the amount of correlation can result in a failure to acquire the satellite because the system fails to recognize the event as a correlation.

Several sources of error contribute to the frequency error. A crystal oscillator such as a Numerically Controlled Oscillator (NCO), typically controls the frequency of a GPS receiver. Crystal oscillators are notorious for wide frequency variability over temperature, and crystal oscillators often feature heated crystals with well-controlled temperature to stabilize the frequency. The frequency of an oscillator of a receiver is quite unpredictable when the receiver is first turned on. High g loading also induces changes to the frequency of crystal oscillators.

Doppler shift is another source of frequency variance. Unfortunately, in the literature surrounding GPS, the terms Doppler shift or Doppler frequency are often used to refer generically to any deviation in frequency from any source. Relative motion between a transmitter and a receiver introduces Doppler shifts to periodic signals. In a receiver, Doppler shift increases as the differential relative velocity increases and as the frequencies increases. For example, the Doppler shift for the 10.23 MHz P(Y) Code is 10 times worse than the Doppler shift for the 1.023 MHz C/A Code. Doppler shift, if left uncompensated, can limit the data transmission rate of future digital communications systems implemented with spread spectrum technology such as cellular telephones and wireless Internet. In a spread spectrum communications system, the rate of modulation of the code signal is much higher than the rate of modulation of the information signal. A simplified formula approximating Doppler shift of a signal is expressed below:

$$f_D = f_S \cdot \frac{\Delta v}{c}$$

In the simplified formula expressed above, $f_D$ is the Doppler shift, $f_S$ is the signal frequency, $\Delta v$ is the difference in relative speed between the transmitter and the receiver, where the relative speed is measured along the axis of propagation of the radio waves emitted by the transmitter, and c is the speed of light. In a sample calculation, a plane moving at a relative velocity towards a satellite at a speed of 1000 miles per hour suffers a 15 Hz Doppler shift in a 10.23 MHz signal. In the GPS constellation, satellites orbit the Earth in low earth orbits and induce a Doppler shift by their own movement as well. The Doppler shift of a signal survives the downconversion in the receiver.

Present methods of compensating for frequency offsets have proven inadequate. Conventional systems acquire the satellite signal by continuously looping and searching for correlation by varying the frequency and the codes. The process of incrementally searching frequencies is very time consuming.

In another conventional system, a Fast Fourier Transform (FFT) is implemented in a circuit to attempt to detect the frequency offset due to oscillator drift or Doppler shift. However, most FFT implementations induce an uneven (sin x)/x response to the frequency domain magnitude. The uneven response of a coherently integrated FFT results in correlation loss in the presence of a frequency offset induced by oscillator drift or Doppler shift. Present methods of compensating for the uneven frequency response of a coherently integrated FFT rely on software, thereby creating heavy processing loads on the CPU. Ironically, the FFT is intended to reduce processing loads on the CPU.

SUMMARY OF THE INVENTION

The present invention solves these and other problems by allowing spread spectrum receivers to quickly acquire a pseudorandom noise signal. In one embodiment, the receiver advantageously detects frequency shifts using a compact parallel process hardware implementation of a Discrete Fourier Transform (DFT). The simultaneous detection of multiple frequencies allows the receiver to search a larger frequency range of the transmitted signal, thereby increasing the speed of acquisition. One embodiment does not use coherent integration before computation of the transform and advantageously maintains a flat frequency response. The flat frequency response of the DFT enables searching of multiple frequency offsets without CPU-intensive processing to compensate for frequency response variations. In one embodiment, the DFT uses an implementation of a Coordinate Rotation Digital Computer (CORDIC) to perform the complex number multiplication. A receiver according to an embodiment of the invention can further include a Doppler correction circuit, which permits correlation data with frequency shift in the code to be non-coherently integrated among relatively fewer addresses or tap positions in memory.

One embodiment uses a complex number multiplier that simultaneously computes multiple products of a complex number multiplicand. In one embodiment, the complex number multiplier multiplies the complex number substantially in compliance with a CORDIC algorithm, where a complex number is multiplied by rotations of angles having arctangents of powers of 2. The complex number multiplier produces products, which are rotated relative to the multiplicand within a first range.

The multiple products produced by the complex number multiplier allow a circuit computing a DFT to select a product rather than compute the product. In one embodiment, the circuit produces rotations greater than the 90-degree first range by additional 90, 180, and 270-degree rotations.

The multiple products produced by the complex number multiplier advantageously allows multiple DFT frequency bins to select products from the complex number multiplier rather than having the multiple DFT frequency bins individually compute the product. The result is a large saving in circuitry when a DFT is implemented in hardware.

In one embodiment, a receiver combines the complex number multiplier with input memory to reduce the amount of total system memory. The input memory can include integration. By storing the input to the DFT in an input memory, and accessing the input memory by data samples which are of different sample periods but in the same relative position within the period, the embodiment advantageously allows the DFT to store the computation result directly sample point by sample point, as opposed to sequence by sequence.

One system further staggers the start and stop times of coherent integration of different frequency bins and clears individual memory locations of coherent integration memory as the memory locations are read. The stagger and clearing allow the system to reuse magnitude computation circuits and continue to accumulate coherent data without employing expensive double buffered memory.

One receiver includes a Doppler offset generator that can advantageously offset a time index used to address a tap position in a non-coherent memory to compensate for code drift in a code with a frequency offset. The amount of offset is computed by accumulating clock cycles of a clock signal that is related to the frequency offset computed by the DFT or FFT frequency bin. The offset aligns a correlation peak in the received code such that the correlation peak can be accumulated in relatively fewer tap positions or addresses.

BRIEF DESCRIPTION OF THE DRAWINGS

These and other features of the invention will now be described with reference to the drawings summarized below. These drawings and the associated description are provided to illustrate preferred embodiments of the invention, and not to limit the scope of the invention.

DETAILED DESCRIPTION OF THE PREFERRED EMBODIMENTS

Figure 1:
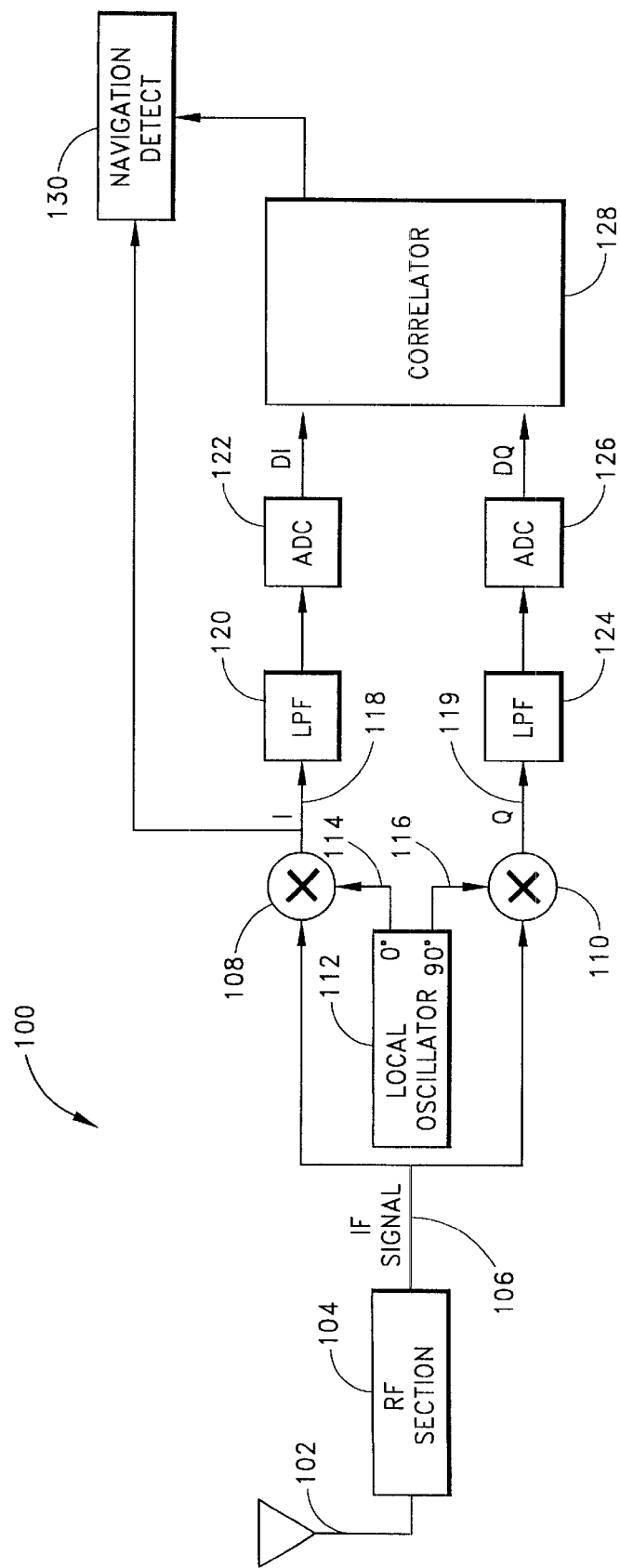
FIG. 1 is a block diagram of a front end of a GPS receiver.

Although this invention will be described in terms of certain preferred embodiments, other embodiments that are apparent to those of ordinary skill in the art, including embodiments which do not provide all of the benefits and features set forth herein, are also within the scope of this invention. In particular, certain embodiments are shown in the context of a GPS receiver. However, the circuits and methods disclosed can apply equally well to other spread spectrum communications systems such as those found in cellular telephones and wireless Internet. Accordingly, the scope of the present invention is defined only by reference to the appended claims.

In a spread spectrum system, transmitted data is spread over a wider frequency band than the minimum band needed to transmit the data. In the GPS system, a satellite transmits its navigation data at a bit rate of 50 Hz with a pseudorandom noise (PN) code signal on a carrier of greater than 1 GHz. When a GPS receiver has locked onto a code signal of a satellite, the receiver has "acquired" the satellite. If the GPS receiver acquires the C/A Code modulated on the L1 carrier, then the GPS receiver can detect the navigation data corresponding to the Standard Positioning Service (SPS) used by civilians. If the GPS receiver acquires the P-Code modulated on the L1 and L2 carriers, then the GPS receiver can detect the navigation data corresponding to the military's Precise Positioning Service (PPS).

The fast acquisition of the code signal is often a key performance parameter for a GPS receiver. Regardless of whether a GPS receiver uses the SPS or PPS service, a GPS receiver performs a lengthy two-dimensional search to acquire a satellite signal. The dimensions are frequency and time. Until the frequency and time of the satellite's signal are recognized, the satellite's signal looks like noise. The first satellite acquired is generally the hardest to acquire because of the number of unknowns. The oscillator frequency is one such unknown. The time is another unknown. Due to the large number of unknowns, the search range for frequencies is relatively large. Once the first satellite is acquired, the frequencies of the other satellites are known to be in a relatively narrower range.

To acquire the Coarse Acquisition Code (C/A Code), a typical receiver searches for the satellite's L1 carrier in small frequency increments. With each frequency increment, the receiver searches for the satellite's 1023-bit (also termed chip) C/A pseudorandom noise (PN) sequence, which is modulated at 1.023 MHz on the L1 carrier. The satellite's C/A PN sequence repeats every millisecond. A correlator in the receiver detects when the sequence repeats to enable the receiver to synchronize to the data on the carrier. Detection of the C/A PN sequence can be very time consuming due to frequency offsets and the number of satellite sequences.

The acquisition of a Precise Code (P(Y) Code) occurs in a similar manner. The P(Y) Code is very long (a week) but a subset of the P(Y) Code can be used for correlation. For example, a GPS receiver can use a 511-bit (chip) reference code to acquire the P(Y) Code. Acquisition of the P(Y) Code can additionally require the use of a decryption key because the Y-Code is encrypted in the anti-spoofing mode of operation.

A GPS satellite modulates the P(Y) Code at approximately 10.23 MHz, making the P(Y) Code more sensitive to frequency offsets than the C/A Code and more difficult (time consuming) to acquire. In noisy environments, the acquisition time increases even further. The detection of a signal buried in noise can require integration, which is very time consuming as multiple samples of signals are taken to lower the noise relative to the signal.

Once the C/A Code or the P(Y) Code is acquired, the receiver can synchronize to the transmitted data. In the GPS system, the transmitted data is a navigation message transmitted at a data rate of 50 bits per second. The SPS navigation message conforms to a 1500-bit message and indicates the satellite's time and position. One embodiment of the present invention is directed to systems and methods of acquiring the C/A Code or the P(Y) Code such that the navigation message can be retrieved.

FIG. 1 illustrates a typical front-end 100 of a spread spectrum receiver. An antenna 102 receives an RF signal, which is downconverted by an RF section 104 to an IF signal 106. A first mixer 108 and a second mixer 110 mix the IF signal 106 with outputs of a local oscillator 112. The local oscillator 112 produces an in-phase (cosine) clock signal 114 and a quadrature (sine) clock signal 116. The first mixer 108 mixes the IF signal 108 with the in-phase clock signal 114 and with the quadrature clock signal 116 to produce an I (in-phase) signal 118 and a Q (quadrature) signal 119 respectively. The I signal 118 is filtered by a first low pass filter 120, and is converted to digital format by a first analog-to-digital converter 122. Similarly, the Q signal 119 is filtered by a second low pass filter 124, and is converted to digital by a second analog-to-digital converter 126.

In one embodiment, the analog-to-digital converters 122, 126 are one-bit comparators and sample the I and Q signals at a rate of at least 2 samples per code chip, to meet the Nyquist criterion for the sampling of an unsynchronized signal. The term code chip is used in the art to denote a code bit from the code signal that modulates the RF carrier. It will be understood by one of ordinary skill in the art that an analog-to-digital converter with more bits, such as 2 or 3 bits, can also be used. Further, a system designed for a high interference environment can use a 2-bit adaptive analog-to-digital converter for the first analog-to-digital converter 122 and the second analog-to-digital converter 126.

Outputs of the first analog-to-digital converter 122 and the second analog-to-digital converter 126 are provided as inputs to a correlator 128. The correlator 128 acquires the code signal and allows a navigation detect module 130 to decode the navigation message from the I signal 118 by synchronizing to the correlation output.

Figure 2A:
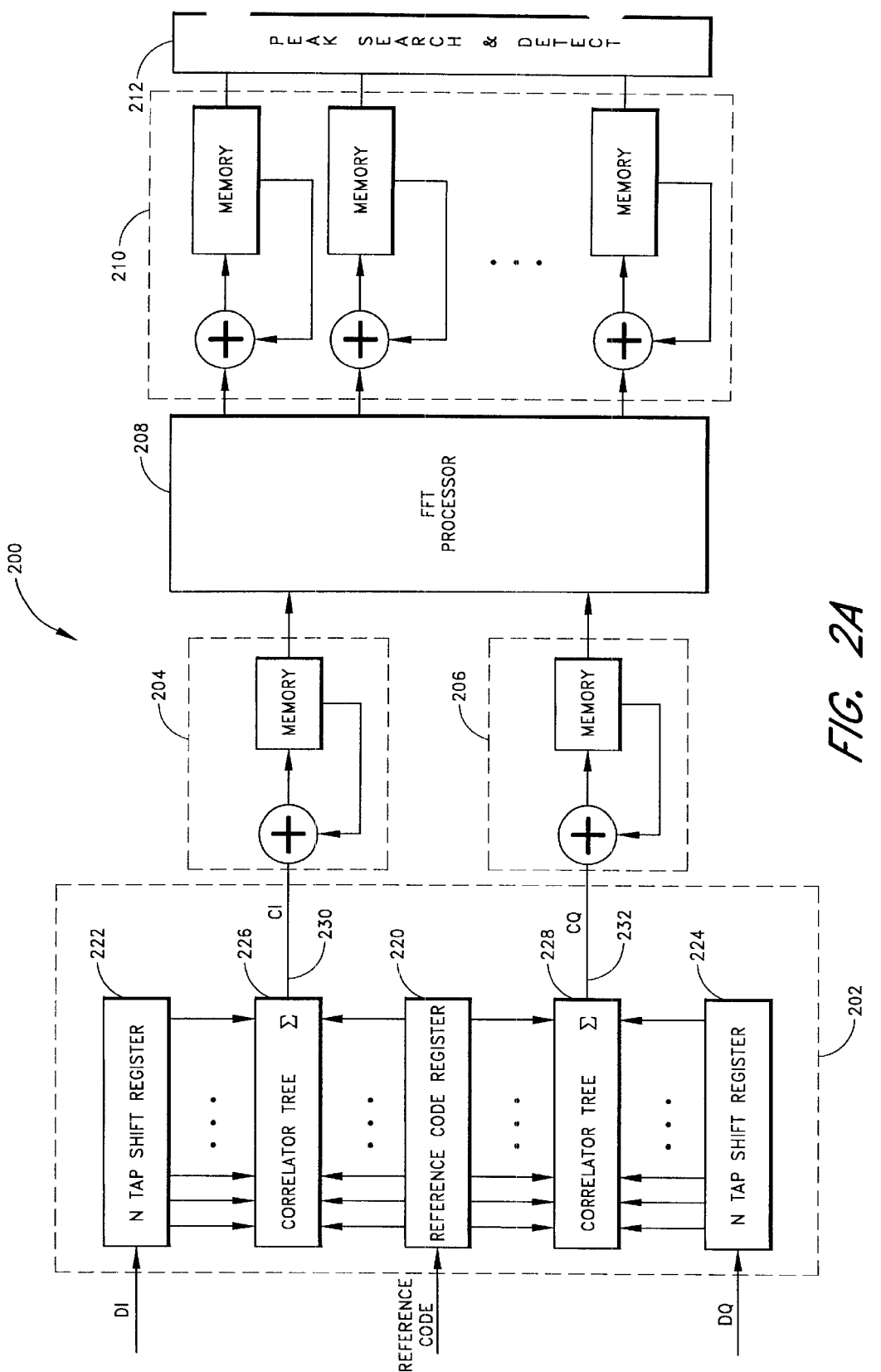
FIG. 2A illustrates a correlator for the computation of a Fourier Transform by a Fast Fourier Transform (FFT) according to the prior art.

FIG. 2A illustrates a general block diagram for a correlator 200 based on computation of a Fast Fourier Transform (FFT). The correlator 200 includes a digital matched filter 202, a first coherent memory 204, a second coherent memory 206, an FFT processor 208, a plurality of non-coherent memories 210, and a peak-search and detect 212.

The digital matched filter 202 provides an output peak when the PN signal received by the receiver matches the reference code for a satellite. The digital matched filter 202 shown includes a reference code register 220, a first shift register 222, a second shift register 224, a first correlator tree 226, and a second correlator tree 228. The first coherent memory 204 and the second coherent memory 206 store the output of the correlator trees 226 and 228, respectively. The coherent memories 204 and 206 can also accumulate the output of the correlator trees 226 and 228 such that a sequence from each coherent memory 204, 206 contains a sum of multiple sequences. This process of accumulating sequences is known as coherent integration. The integration is termed coherent because the I or in-phase components are added separately from the Q or quadrature components. As will be explained in greater detail later, the presence of memory due to an FFT implementation and coherent integration performed ahead of the calculation of the Fourier Transform can be disadvantageous.

The FFT processor 208 implements a Fourier Transform to convert the sampled and stored time domain sequence into a frequency domain response. Computation of a Fourier Transform allows a receiver to search several frequencies in parallel. The magnitude of the frequencies found in the transformed sequence are further integrated non-coherently by the plurality of memories 210 and are provided as inputs to the peak-search and detect 212. If the detection exceeds a predetermined threshold in a frequency bin, the peak-search and detect 212 considers the signal as acquired at the bin's frequency.

The reference code register 220 stores a PN sequence corresponding to a satellite. As the I signal 118 and Q signal 119 are digitized, the samples respectively shift across the first shift register 222 and the second shift register 224 at the rate of the sample clock. In between shifts, the samples dwell in a register and are individually accessed by the correlator trees 226 and 228 through taps in the shift registers 222 and 224. In simple implementations, each correlator tree 226, 228 includes a series of XOR gates to make a bit-by-bit comparison of the contents of the reference code register 220 with the contents of the shift registers. The outputs of the XOR gates are then summed in an adder tree. The outputs of interest of the digital matched filter are the outputs of the adder trees for the I and the Q signals respectively represented in FIG. 2A as CI 230 and CQ 232. The greater the correlation between the PN signal captured by a shift register and the PN sequence stored in the reference code register, the higher the output 230, 232 of the correlator tree 226, 228. In systems where the analog-to-digital converters 122, 126 quantize to more than one bit, the XOR gates are replaced by multipliers.

When the contents of the reference code register 220 do not correlate to the received signal, each correlator tree 226, 228 generates random noise without a significant peak. When the contents of the reference code register 220 correlate with the PN sequence captured in a shift register, the output of the correlator tree 226, 228 exhibits a peak value. If the correlation peak exceeds a predetermined threshold value, the satellite corresponding to the PN sequence in the reference code register 220 is acquired.

Spread spectrum receivers are often specified in noisy environments where an interfering signal is strong relative to the desired signal. In such noisy environments, a correlation peak of a single sample can be difficult to detect reliably without integration. Integration involves repetitively accumulating periodic signals in accordance with the period of the signal to cancel out noise. The correlation peak can rise up through the noise because uncorrelated portions of the signal accumulate less quickly than the correlated peaks. Here, the signal is the output of the digital matched filter 202. For example, the C/A Code for a GPS satellite repeats approximately every millisecond. Hence, the digital matched filter 202 outputs a correlation peak for the correlated C/A Code approximately every millisecond. Similarly, when the digital matched filter 202 is set up to correlate with an abbreviated P(Y) Code segment of 511 bits, the digital matched filter 202 outputs a correlation peak approximately every 50 microsecond ($\mu S$).

Figure 2B:
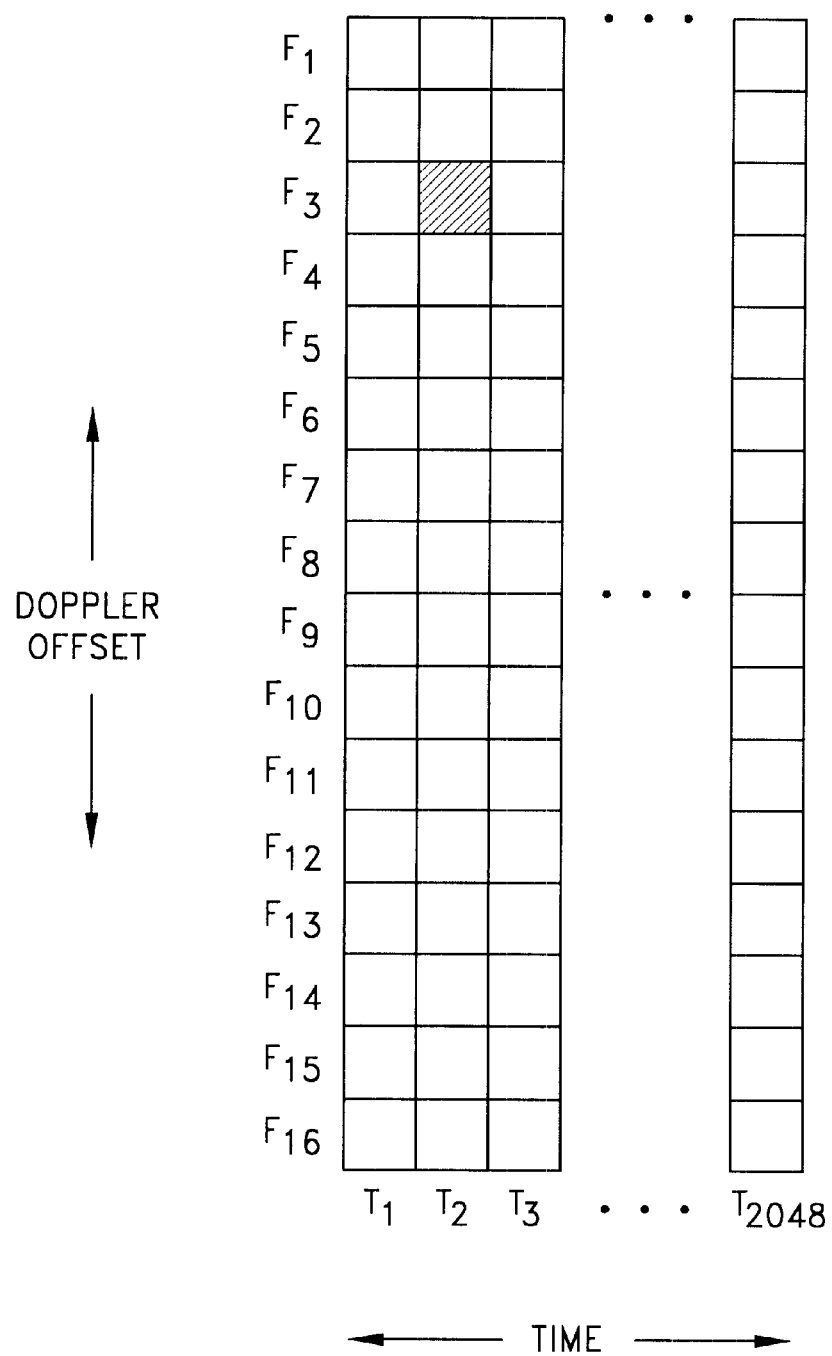
FIG. 2B illustrates a two-dimensional range to be searched.

FIG. 2B illustrates an example of a two-dimensional range to be searched by the correlator 200 in the form of a frequency-time array. The frequency-time array shown in FIG. 2B contains 16 rows and 2048 columns. Each of the 16 rows corresponds to a frequency bin in a correlator. Each of the 2048 columns corresponds to the timing of a tap within the correlator. For example, a correlator in a GPS receiver acquiring the 1023-bit C/A PN sequence and sampling the sequence at slightly higher than the Nyquist rate of 2 samples per bit, can contain 2048 samples per cycle. The duration of the C/A period is 1 millisecond. Therefore, each 1/2048 of a cycle, or each tap position, indicates a delay time. The situation for P(Y) Code is more complicated because the period of the P-Code is 1 week (the unencrypted Y-Code is not periodic). Thus, for P(Y) Code detection, a reference code dependent on time is also searched.

When a satellite is acquired, one of the elements in the frequency-time array shows a relatively large amount of correlation. A shaded element in the frequency-time array (located at the third frequency bin $F_3$ and the second tap position $T_2$) represents the frequency and time of acquisition. The plurality of memories 210 illustrated in FIG. 2 can contain the frequency-time array.

Figure 3:
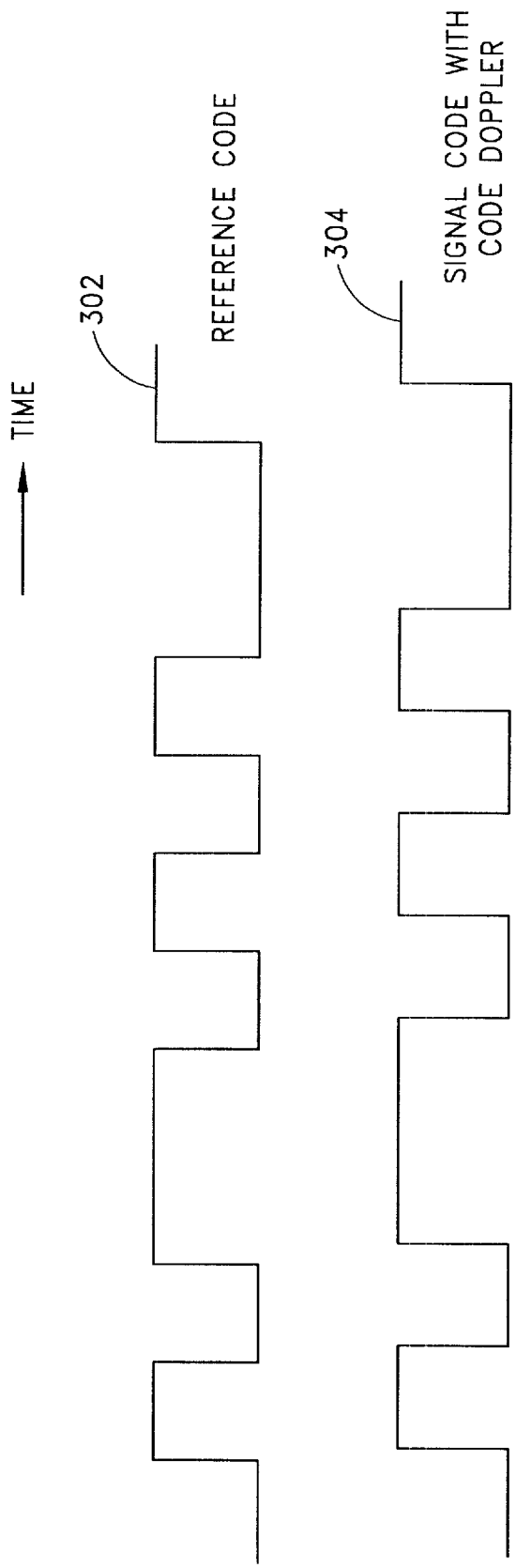
FIG. 3 illustrates the effect of Doppler shift on C/A Code or P(Y) Code.

One of the difficulties in acquiring a signal is that a detection threshold that is too low can result in false alarms, and a detection threshold that is too high can result in missed correlations. A frequency error between the receiver and the received signal results in a timing mismatch between the reference code and the signal code as shown in FIG. 3. In FIG. 3, a reference code 302 for a short PN sequence is displayed along a horizontal time axis. A signal code 304 corresponds to the same PN sequence but with a slight Doppler shift. FIG. 3 illustrates that a frequency mismatch eventually results in a loss of correlation and can result in a loss in detection. However, frequency searching can be very time consuming because the frequency range to search can be large. Thus, it is desirable to search many frequencies in parallel.

Computation of the Fourier Transform allows a PN receiver to search several frequencies in parallel, thereby lowering the acquisition time. The Fourier Transform can detect a frequency shift because a Doppler shift in the code results in the envelope of correlated peaks having a Doppler shifted frequency component. However, the computation of the Fourier Transform by typical FFT techniques introduces several disadvantages.

Despite computational benefits of the FFT, a significant disadvantage to an FFT implementation is that an FFT requires an input memory. The first coherent memory 204 and the second coherent memory 206 represent the input memories for the FFT-implemented correlator 200. The FFT requires memory because the FFT computes the Fourier Transform by accessing the input sequence in a bit-reversed order. For example, in an 8-point FFT, the data is accessed in the order of {000, 100, 010, 110, 001, 101, 011, and 111} or {0, 4, 2, 6, 1, 5, 3, 7}.

When the PN receiver is designed for noisy environments, and many input samples are taken to improve the signal to noise ratio of the correlation peak, the input memory required for an FFT can quickly exceed a practical size and cost. When reducing acquisition time is important, the amount of input memory is usually doubled in order to allow the FFT to process existing data while allowing the input memory to continue to store new data. Such memories are called double-buffered memories. Another disadvantage of an FFT implementation is that for efficient computation, the number of input sequences sampled by the FFT should conform to powers of 2. Some convenient numbers of points for conventional FFT implementations are 8, 16, 32, and 64.

Large and fast memories are often prohibitively expensive and can require the use of external memories. One of ordinary skill in the art will also generally prefer to combine as many functions as possible on as few components as possible. For these reasons, it is ubiquitous for an FFT implementation to include coherent integration together with the input memory to reduce the input memory size. As will be described in greater detail later, although input memory and coherent integration of input memory can be used with a Discrete Fourier Transform (DFT) implementation of a Fourier Transform, neither input memory nor coherent integration of inputs is necessary in a DFT implementation. Another reason coherent integration is almost always present in an FFT is to increase the flexibility of the number of input sequences sampled by the FFT. Coherent integration allows an FFT based system to use a multiple of 2 rather than a power of 2 because the coherent integration can effectively factor the number of sequences down to a power of 2. The following equation represents a sequence coherently integrated from eight other sequences where n is periodic with N:

$$y[n] = \sum_{i=0}^{7} x_i[n]$$

Figure 4:
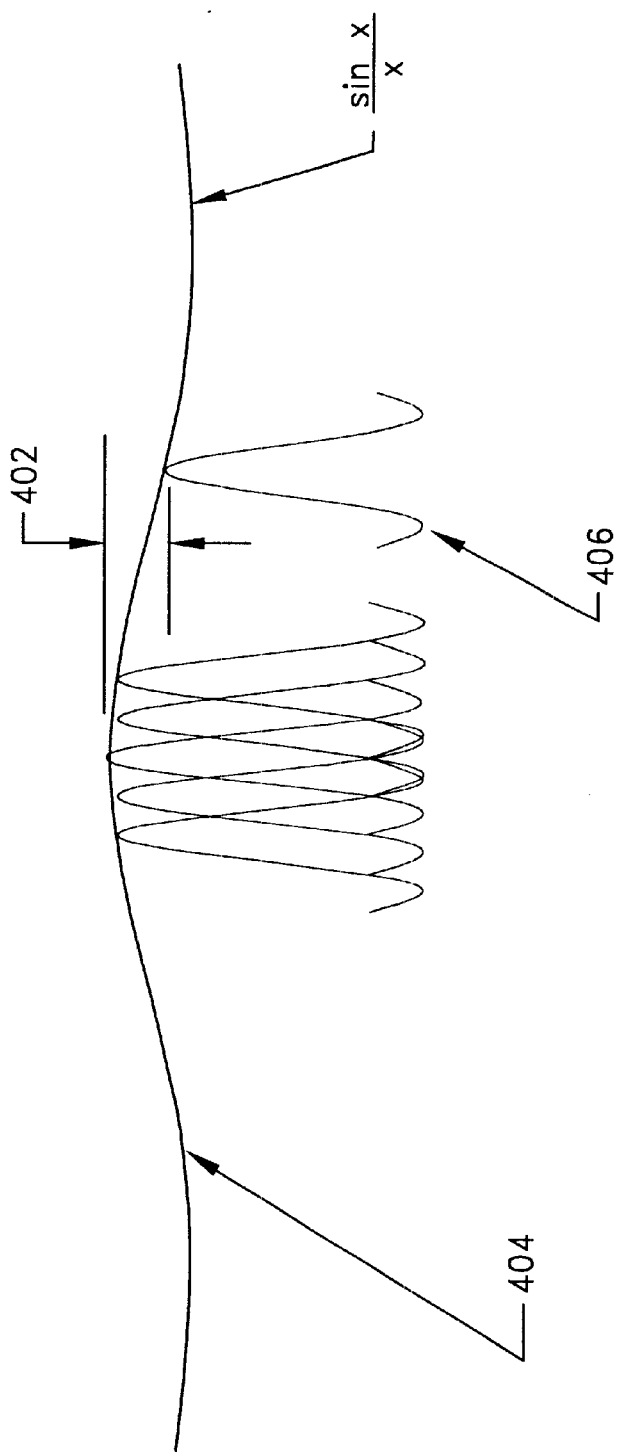
FIG. 4 illustrates the effect of Doppler shift on correlation peaks.

However, coherent integration ahead of the computation of a Fourier Transform has disadvantages. FIG. 4 illustrates that coherent integration ahead of the computation of the FFT introduces a (sin x)/x response 404 to the frequency domain magnitude as shown in FIG. 4. The following equation summarizes the magnitude response of the FFT over frequency:

$$L_C = \frac{\sin(\pi F_0 T_C)}{\pi F_0 T_C}$$

In the formula expressed above, $L_C$ represents the magnitude response within the transform. $F_0$ is the frequency of the bin. $T_C$ is the correlation integration time ahead of the computation of the transform. For example, when the center of the frequency bin of interest is the outer bin 406 at 200 Hz from the center and the coherent integration time is 2.5 milliseconds, the loss is 3.92 dB as indicated by the outer bin correlation response loss 402.

The uneven response due to the coherent integration ahead of the FFT results in correlation loss in the presence of a frequency offset such as induced by oscillator drift or Doppler shift. The effect is worse at the band edges as the sample calculation indicates. One method of compensating for the correlation loss of a coherently integrated FFT uses software, which ironically negates many of the computational benefits of the FFT. Other methods narrow the search range of the frequencies to a range wherein the response is reasonably flat and in so doing, decrease the number of parallel frequencies that can be searched. The result is that an FFT based correlator does not acquire a satellite signal quickly and efficiently.

Those of ordinary skill in the art have avoided computing the Fourier Transform as a DFT because existing methods of computing the DFT require many complex number multiplies and have proven impractical to implement. Applicants have recognized that a DFT implemented around a Coordinate Rotation Digital Computer (CORDIC) results in a dramatic reduction in circuit complexity and still retains the advantages of computation via DFT.

Figure 5B:
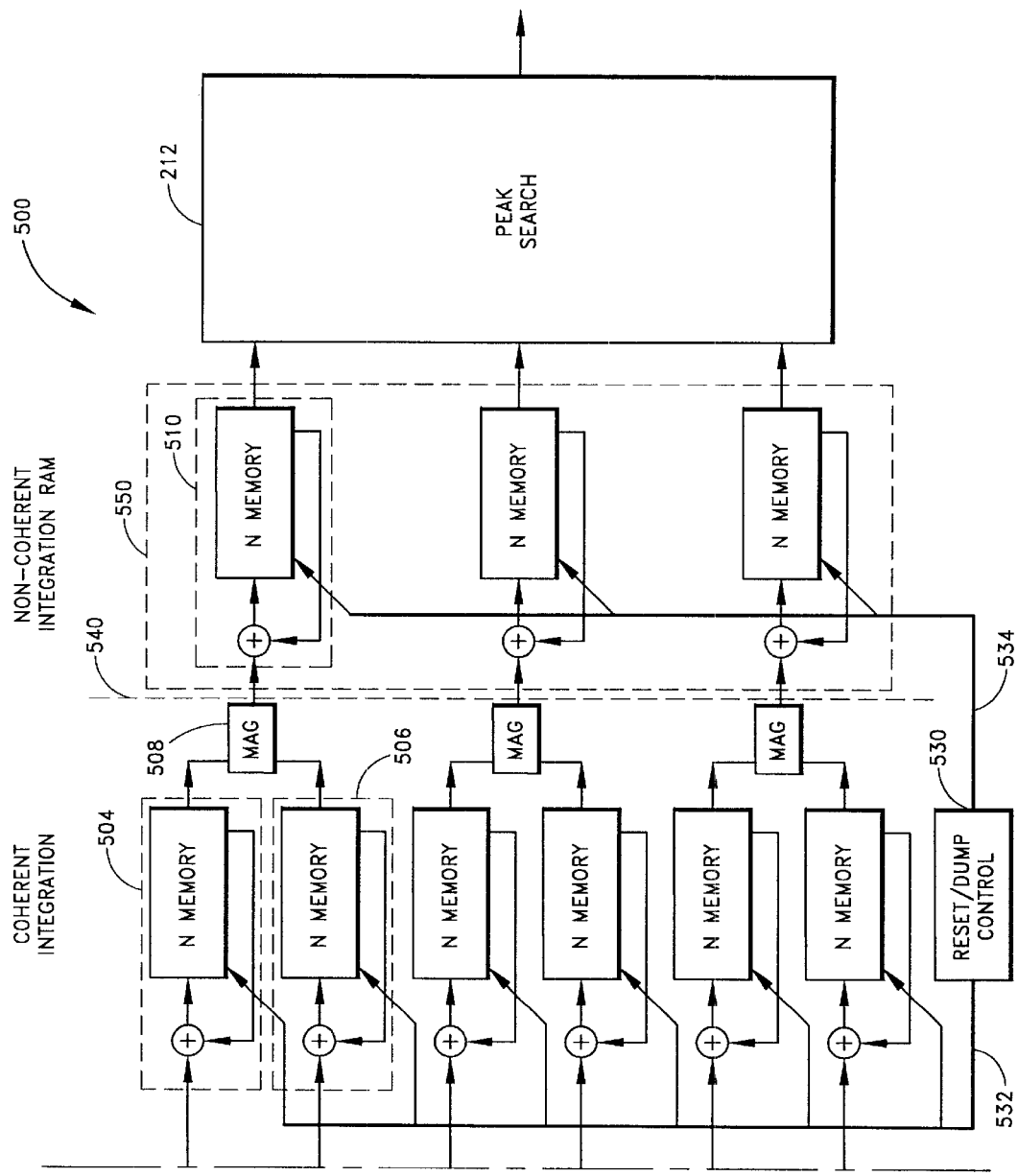
FIG. 5 consists of FIGS. 5A and 5B and illustrates a correlator without input memory implemented with a Discrete Fourier Transform (DFT) where complex number multiplication is performed with a Coordinate Rotation Digital Computer (CORDIC).

FIG. 5 illustrates a correlator 500 without input memory where the Fourier Transform is computed as a DFT. The correlator 500 advantageously eliminates a large input memory and eliminates the undesirable (sin x)/x transfer function resulting from coherent integration ahead of the Fourier Transform. By removing the input memory, the correlator 500 removes a cost driver of a correlator. The elimination of the (sin x)/x transfer function allows broad frequency searching at the outer edges which in turn allows the correlator to search more frequencies in parallel without additional intensive CPU computations to compensate for the (sin x)/x response.

The DFT correlator 500 includes the digital matched filter 202, the peak-search and detect 212, CORDIC phase rotators 502, 512, 524, a first coherent integration memory 504, a second coherent integration memory 506, a magnitude detector 508, a non-coherent integration memory 510, a DFT iteration control 520, and a reset/dump control 530.

The digital matched filter 202 is described in connection with FIG. 2A. As will be understood to one skilled in the art, the correlator 500 can include multiple digital matched filters to parallel the search for a satellite code. When digital matched filters are paralleled, the receiver can search for multiple satellite codes simultaneously and thereby reduce acquisition time.

The DFT correlator 500 produces multiple frequency bins to allow parallel searching over frequency. The DFT correlator 500 shown in FIG. 5 has 3 such frequency bins. It will be understood by one of ordinary skill in the art that the number of frequency bins can easily be expanded to include more bins. The topology of the DFT correlator 500 also allows the designer to determine the number and spacing of the frequency bins arbitrarily due to the DFT implementation.

A traditional DFT computes the following summation:

$$DFT(\omega) = \sum_{n=0}^{N-1} S(nT) \, e^{jn\omega T}$$

In the formula expressed above, $\omega=2\pi f$, where f is the frequency of the bin and f is an integer multiple of (1/NT), where N is the total number of samples, and T is the time interval between samples.

In the DFT correlator 500, the total summation of the samples is not taken. Rather, the DFT correlator 500 maintains the samples separately per correlator tap as indicated by the N-size memories used by the first coherent integration memory 504, the second coherent integration memory 506, and the non-coherent integration memory 510. By preserving the samples per tap, the DFT correlator 500 can identify the position of the tap, or the time, when correlation and hence acquisition occurs.

Values for N and T depend on whether the receiver is set up to receive C/A-Code or P(Y) Code and also is somewhat dependent on selection. Preferably, the product of N and T is 20 mS or a sub-multiple of 20 mS, which is (1/50 Hz) since 50 Hz is the rate of the navigation data message. For example, N can include samples from multiple periods of C/A-Code. T is equal to the product of the code chip rate and the number of samples per code chip. For example, where there are 2 samples per code chip, T is approximately 489 nS for C/A Code and 48.9 nS for P(Y) Code.

Low signal-to-noise ratio environments can require the integration of samples for periods greater than 20 mS. Integration of samples for longer than 20 mS in coherent memory are distorted by the 50-Hz navigation message. Prior to acquisition, the 50-Hz navigation message affects the phase of the correlation in an unpredictable manner. Thus, the non-coherent integration memory accumulates the magnitudes of coherent integration results for relatively long periods of integration. In one example, the coherent integration accumulates samples for 4 milliseconds and the non-coherent integration accumulates samples for 5 seconds.

Computation of the DFT by summation of complex number multiplies does not require that the input data be accessed in any particular order. Although calculation of the desired angle (jωT) can be simple, historically, the computation of complex number multiplies has been difficult. The DFT correlator 500 illustrates an implementation of a DFT that computes the DFT quickly, compactly, and efficiently.

To describe the operation of the DFT correlator 500 in more detail, the computation of one DFT frequency bin within the DFT correlator 500 will now be described. The DFT iteration control 520 receives a clock signal from the digital matched filter 202. In response to the clock signal 526, the DFT iteration control 520 produces an angle signal 522 which is provided as an input to the CORDIC phase rotators 502, 512, 524. The angle signal 522 indicates the amount of rotation to be applied by the CORDIC phase rotators 502, 512, 524 such that the vector from the digital matched filter is multiplied in accordance with the angle specified by the DFT computation. In one embodiment, the angle signal 522 is a plurality of angle signals, each of which controls one CORDIC phase rotator.

The CORDIC phase rotator 502 performs complex number multiplication while the first coherent integration memory 504 and the second coherent integration memory 506 perform the summation. As the summation is a complex number, the magnitude detector 508 converts the complex number to a magnitude (vector to scalar). Line 540 indicates where the DFT is available for the frequency bins. When the DFT correlator 500 begins a new interval of coherently integrated sequences, the reset/dump control 530 clears the coherent integration memories 504, 506 through the reset/dump signal 532.

The non-coherent integration memory 510 accumulates multiple DFT computations to enhance detection of signals buried in a high noise environment. To non-coherently integrate a new set of sequences, the reset/dump control 530 clears the non-coherent integration memory 510 via a control signal 534. A set of non-coherent integration memories 550 can contain the frequency-time array described in connection with FIG. 2B.

Figure 14:
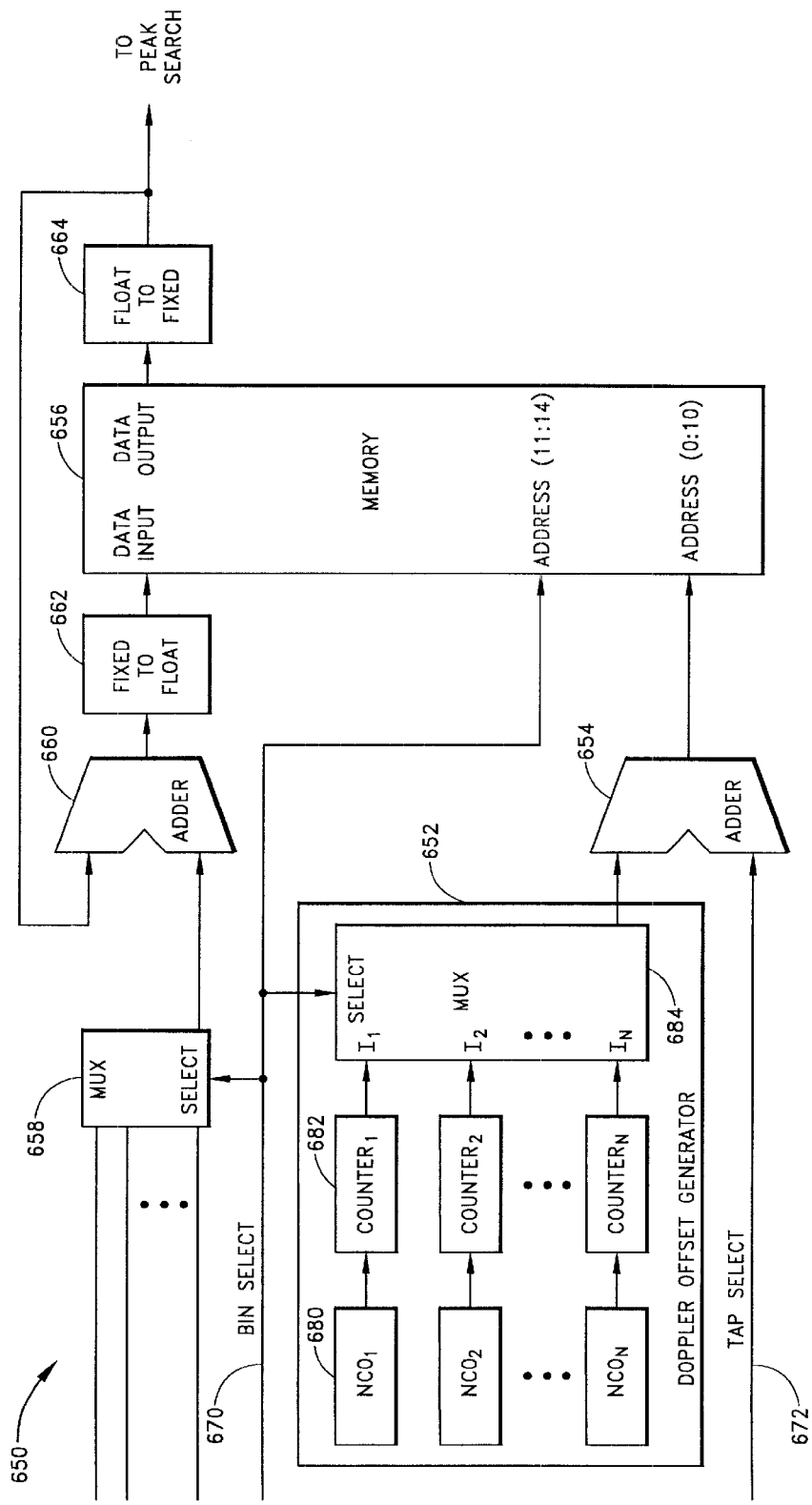
FIG. 14 illustrates an implementation of non-coherent memory with Doppler correction.

FIG. 14 illustrates a Doppler corrected memory 650, which is one embodiment of the non-coherent integration memories 550 that advantageously shifts memory locations (addresses) in the non-coherent memories 550 to correct for Doppler shifts or frequency offsets in integration samples. The Doppler corrected memory 650 can be used with either a DFT correlator or an FFT correlator.

With relatively long integration times as encountered for the non-coherent memories 550, 650, the correlation peak, if there is one, can change tap positions in the presence of a frequency offset. For example, if the detected code has 10 Hz of Doppler shift in the code, then every 1/10 Hz or 100 milliseconds, the point of correlation shifts by one code chip. In a system that samples the detected code at the rate of 2 samples (or taps) per code chip, this means that every 50 milliseconds, the correlation point moves one tap along the correlator tree.

The Doppler corrected memory 650 compensates for the drift in tap position by accumulating the magnitude of non-coherent samples in shifted tap positions in a memory 656 corresponding to DFT or FFT bins with frequency offset. In a frequency bin with no frequency offset (center channel), there is no shifting of tap positions.

The Doppler corrected memory 650 further includes a Doppler offset generator 652, a first adder 654, a data multiplexer 658, and a second adder 660. A bin select signal 670 controls a select to the Doppler offset generator 652. The output of the Doppler offset generator 652 is summed with a tap select signal 672 by the first adder 654 to specify a portion of the address bits of the memory 656. The tap select signal 672 is a time index signal that indicates the tap position of the received sample where no frequency offset exists. When the tap select signal 672 is summed with the output of the Doppler offset generator 652, the summation can correct for the frequency drift of a correlation peak in a signal with a frequency offset.

The Doppler offset generator 652 assumes that the Doppler frequency, which is an unknown prior to correlation, is a frequency that corresponds to a DFT or FFT frequency bin. At time periods corresponding to $\{(f_{bin}) \cdot (\text{taps/code chip})\}^{-1}$, the system accumulates the magnitudes of coherent samples with non-coherent samples of the next tap position. In the 10-Hz example with 2 taps per code chip and 5 seconds of total integration time, the system would have shifted the last accumulations of the magnitudes of coherent integration samples by 49 tap positions relative to the first accumulation of the magnitudes of the coherent integration samples. The Doppler offset generator 652 provides the tap position offsets to correct for the frequency offset induced drift.

Of course, the frequency bin can compute either positive or negative frequency. With positive frequency, the magnitudes are shifted and accumulated forward in time, i.e., to a memory location representing a tap position earlier in time. With negative frequency, the magnitudes are shifted and accumulated back in time, i.e., to a memory location representing a tap position later in time.

In one embodiment of the Doppler offset generator 652, a numerically controlled oscillator (NCO) 680 for a frequency bin with a time period corresponding to $\{(f_{bin}) \cdot (\text{taps/code chip})\}^{-1}$ increments a counter 682, which accumulates the clock cycles of the NCO 680 to compute the tap position offset. An address multiplexer 684 driven by the bin select signal 670 selects the counter that corresponds to the frequency bin that is computed. An NCO 680 can be constructed from a "divide by N" circuit that can be connected to the system clock or a derivative thereof, such as the clock that generates the tap select signal 672. In one embodiment, where an address later in time is represented by a higher number address (notwithstanding resets back to zero), an output of the Doppler offset generator 652 for a positive frequency bin computes successively more negative offsets for the adder 654. A negative offset can be generated by a count-down counter or by a 2's complement of a positive counter. Of course, a negative offset can also be generated by subtracting a positive offset from the tap select signal 672.

In embodiments with a degree of symmetry with respect to the computed frequencies, one NCO and one counter can compute the offsets for a positive and a negative frequency bin. For example, the output of a count-up counter can be applied to the negative frequency bin (such as −10 Hz) and a 2's complement of the count-up counter can be applied to the positive frequency bin (such as +10 Hz). In another embodiment, a microcontroller under firmware control maintains the offset. In one example, the microcontroller can update a register that stores the offset in response to an interrupt from a programmable timer.

The bin select signal 670 can also select the most significant bits of the memory 656 such that one memory can contain the non-coherent integration of more than one frequency bin. In one embodiment with 16 frequency bins and 2048 tap positions, the lower 11 bits of addresses to the memory 656 select the tap position (represented by columns in FIG. 2B) and the upper four bits of addresses select the frequency bin (represented by rows in FIG. 2B).

Figure 9A:
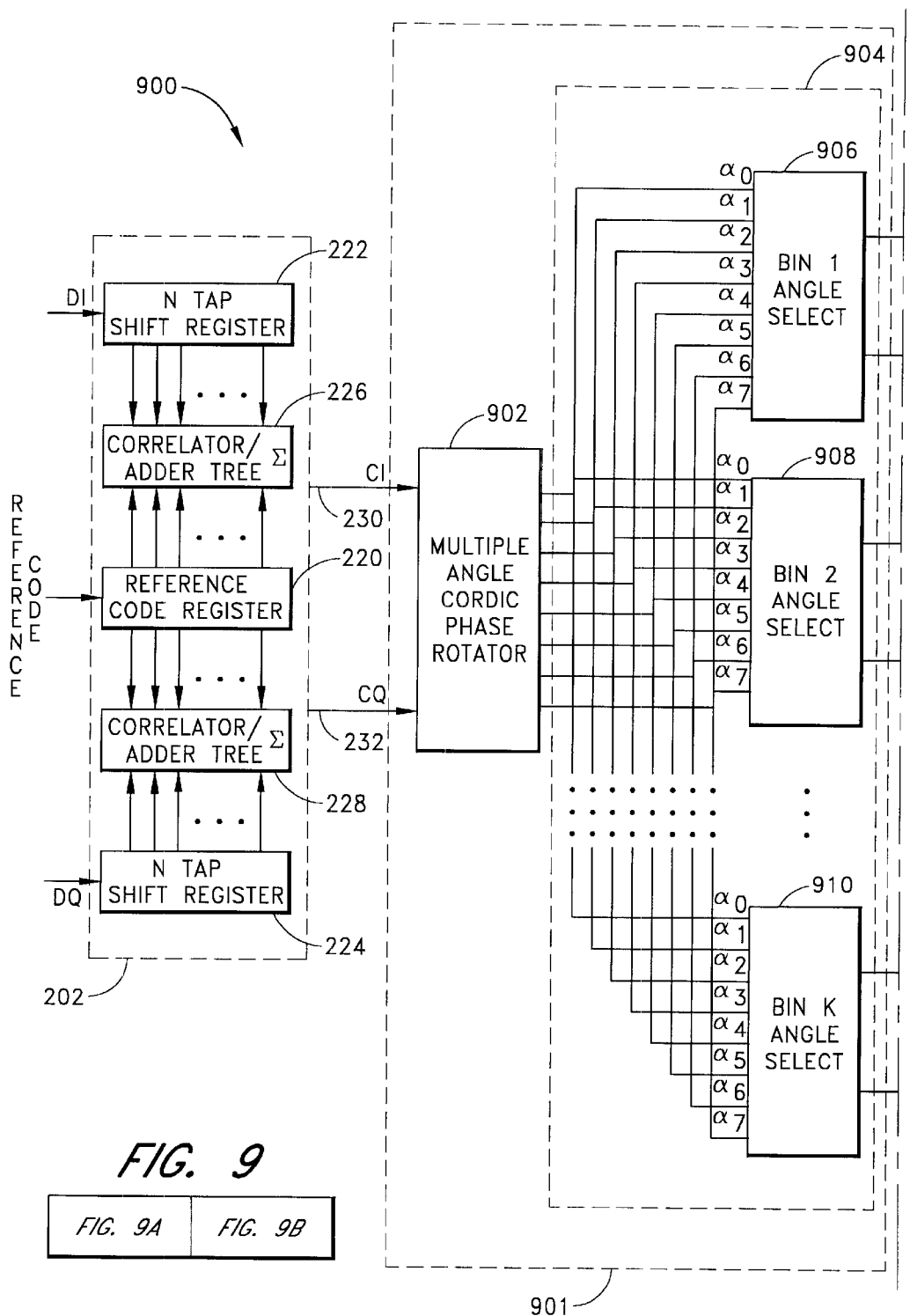
FIG. 9 consists of FIGS. 9A and 9B and illustrates a correlator implemented with a complex number multiplier that simultaneously computes multiple complex number multiplies.
Figure 9B:
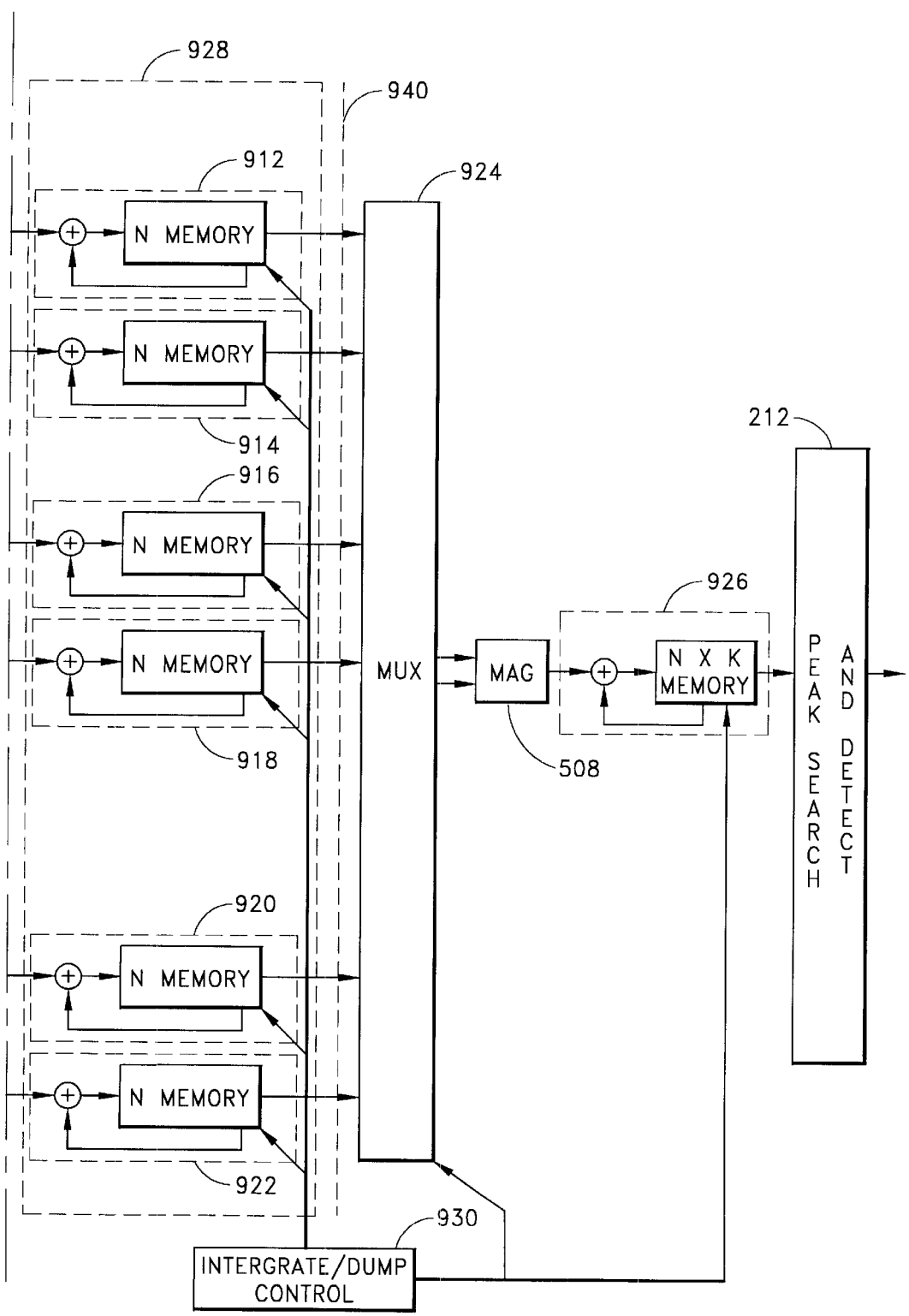

The bin select signal 670 also selects the input of the data multiplexer 658. The inputs of the data multiplexer 658 are connected to the outputs of the magnitude detectors 508 for the frequency bins. The data multiplexer 658 selects the output of the magnitude detector 508 that corresponds to the frequency bin that is computed. Where a single magnitude detector 508 is used, such as in an alternative embodiment of a DFT correlator 900 as shown in FIG. 9, the data multiplexer 658 can be omitted.

The output of the data multiplexer 658 is provided as an input to the second adder 660 and is combined with an output of the memory 656 to accumulate the new data from the magnitude detector 508 with previously accumulated data from the memory 508. One embodiment of the Doppler corrected memory 650 further includes a fixed number to floating number circuit 662 and a floating number to fixed number circuit 660 to allow the memory 656 to store the accumulation in a floating point format. An output of the floating to fixed number circuit 660 can be provided as an input to the peak-search and detect 212 such that the peak-search and detect 212 can detect fixed number format signals.

The CORDIC phase rotator 502 will now be described in greater detail. A complex number multiplication can be thought of as a rotation of a vector. A multiplication of a sample by an $e^{jn\omega T}$ term rotates the sample by nωT (radians). The sample, S(nT) is a complex number presented to the CORDIC phase rotator 502 in rectangular form as shown in the formula below.

$$S(nT)=x+jy$$

where $j=\sqrt{-1}$

In the formula expressed above, x is the output at time nT of the first correlator tree 226 and y is the output at time nT of the second correlator tree 228. The CORDIC phase rotator 502 performs the multiplication to S(nY) by rotating the sample in accordance with the angle specified by the $e^{jn\omega T}$ term of the DFT summation, then storing the real component of the rotated vector in the first coherent integration memory 504 and storing the imaginary component of the rotated vector in the second coherent integration memory 506.

One implementation of the CORDIC algorithm rotates a complex vector in a range of approximately 0 to 90 degrees. When the DFT specifies more than 90 degrees of rotation, the CORDIC phase rotator 502 initially shifts the vector by a 90, 180, or 270-degree increment without using the CORDIC algorithm and then uses the CORDIC algorithm to compute the rest of the rotation. In one embodiment, the CORDIC phase rotator 502 performs the 90, 180, or 270-degree rotation after the less-than 90 degree rotation. Table I, below, provides that vector rotations of 90, 180, and 270 degrees are simple to implement and do not affect the magnitude of the vector. As will be explained in greater detail later, the vector rotations of 90, 180, and 270 can be used in another embodiment wherein all the rotation vectors are computed simultaneously in one step. The vector in the table below is originally at (x,y) and rotates to $(x_r,y_r)$.

TABLE I

| initial rotation angle (θ) | pre-CORDIC rotation increment | $x_r$ | $y_r$ |
|---|---|---|---|
| 0 ≦ θ < 90 | 0 | x | y |
| 90 ≦ θ < 180 | 90 | -y | x |
| 180 ≦ θ < 270 | 180 | -x | -y |
| 270 ≦ θ < 360 | 270 | y | -x |

A vector rotation smaller than 90 degrees is harder to implement. However, the CORDIC algorithm efficiently computes vector rotations in hardware because the CORDIC algorithm reduces vector rotations to iterations of shifts and adds (or subtracts). A review of basic trigonometry can be helpful in understanding the CORDIC algorithm. Using Cartesian coordinates, a vector initially directed to x+jy on a complex plane rotates with respect to the origin to a new vector x'+jy'. Let "α" denote the angle between the vector at (x,y) and the vector at (x'y'). The new coordinates (x',y') can be expressed in terms of the old coordinates and the angle a as follows:

$$x'=\cos \alpha [x-y \tan \alpha]$$
$$y'=\cos \alpha [y+x \tan \alpha]$$

The CORDIC algorithm similarly rotates a vector. However, the angle α is chosen such that the tan α term is always a power of 2. Thus, tan α is computed with a simple binary shift. A further savings in processing occurs when the cos α term is not computed with the rotation. Although ignoring the cos α term results in a gain of the magnitude of the vector as the bracketed terms are computed, the gain is predictable and, where necessary, can be taken into account after the iterative rotations have been completed. As will be discussed in greater detail later, one embodiment of the correlator 500 does not require compensation for the gain that occurs as a result of ignoring the cos α term.

The CORDIC algorithm gradually rotates the vector by sequentially rotating the vector in smaller and smaller increments. The magnitude of tan α follows in the sequence: $2^0$, $2^{-1}$, $2^{-2}$, $2^{-3}$ . . . and so on. At each rotation, the vector can be incrementally rotated in a positive or negative direction. It is the sequence of directions (sign of the angle) chosen during the rotations that determines the final composite rotation of the CORDIC phase rotator 502. As will be described in greater detail later, one embodiment takes advantage of the property that sign changes determine the final angles and advantageously computes all angles in one step. During computation, the direction of rotation taken does not affect the cos α term because cos (−β)=cos (β). Thus, the gain is unaffected by the total rotation. However, tan (−β)=−tan (β) and is taken into account.

Figure 6:
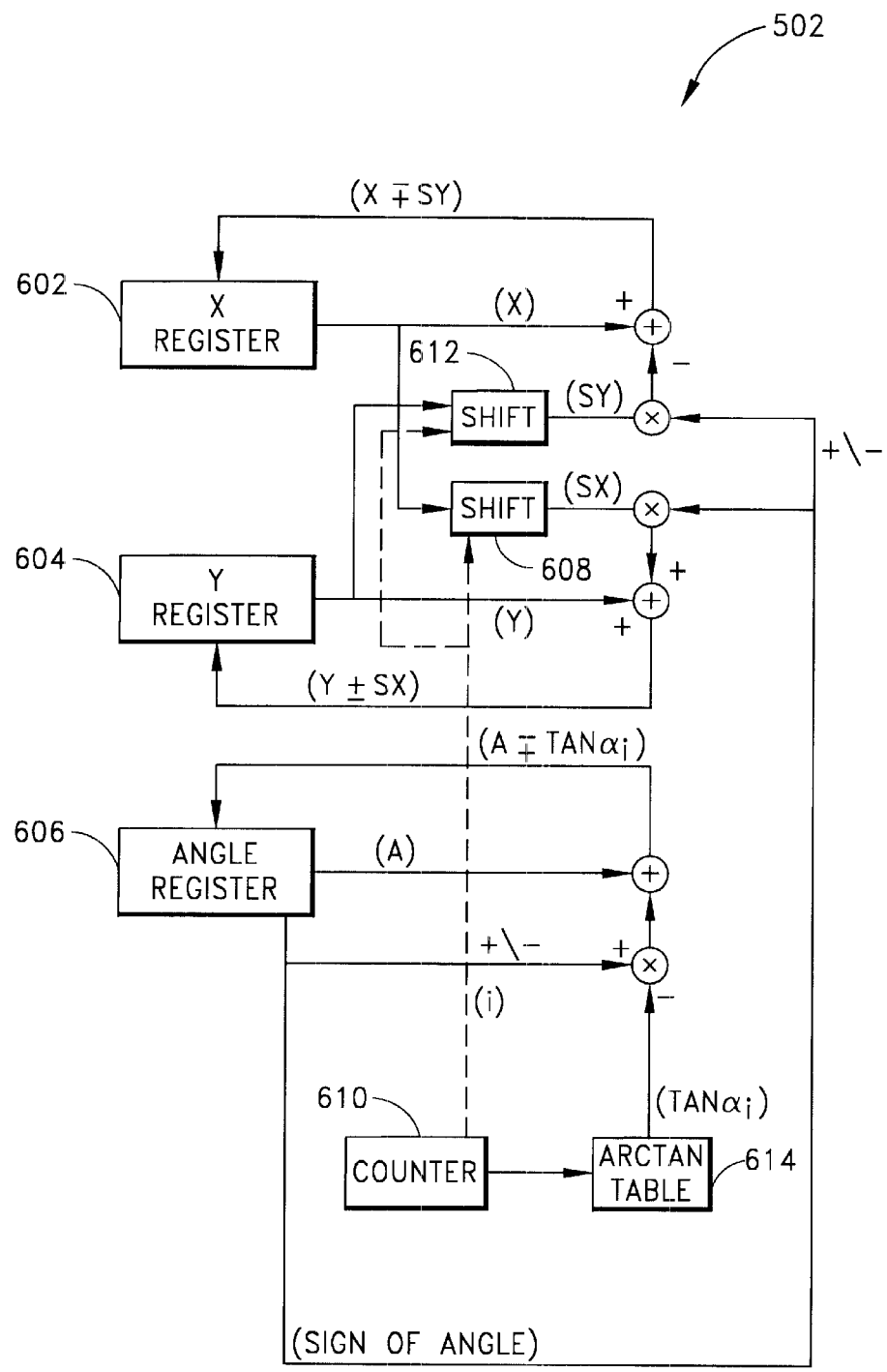
FIG. 6 illustrates one hardware implementation of the CORDIC configured to perform a complex number multiplication.

FIG. 6 illustrates one hardware implementation of the CORDIC phase rotator 502. The vector to be rotated is the output of the I-correlator tree 226 (x-component) and the Q-correlator tree 228 (y-component). Once the 90, 180, and 270-degree initial rotation is applied to the vector, the vector is loaded into the CORDIC phase rotator 502. Initially, an X register 602 and an Y register 604 respectively contain the outputs of the I correlator tree 226 and the Q correlator tree 228 (after rotation by 90, 180, 270 degrees as necessary). The initial content of an angle register 606 is the desired rotation of the CORDIC phase rotator 502, which in this implementation ranges from 0 to 90 degrees. The sign of the contents of the angle register 606 controls the rotation direction of the rotation increment by controlling the sign of the outputs of the first shift register 608 and the second shift register 612 as they are applied to the contents of the X register 602 and the Y register 604. The CORDIC phase rotator 502 illustrated in FIG. 6 is iterative. In one embodiment, the CORDIC phase rotator 502 is instead implemented in a pipeline structure to allow the CORDIC phase rotator 502 to process more than one vector at a time.

A first shift register 608 implements the power of 2 (tan α) multiplication to the content of the X register 602. The amount of the shift (the power of 2) is determined by a counter 610. The counter 610 similarly controls the amount of shift that a second shift register 612 performs to the content of the Y register. An arctangent table 614 is a lookup table and stores the angle of incremental rotation applied to the vector. For example, for the power of 2 rotations of $2^0$, $2^1$, and $2^2$, the contents of the arctangent table 614 are respectively 45, 26.57, and 14.04 degrees. The contents of the arctangent table 614 are added to or subtracted from the contents of the angle register 606 depending on the direction of rotation. The contents of the angle register 606 thus contain the amount and direction of the rotation remaining. If the rotation is in the positive direction, the arctangent is subtracted from the contents of the angle register 606. If the rotation is in the negative direction, the arctangent is added to the contents of the angle register 606.

Figure 7:
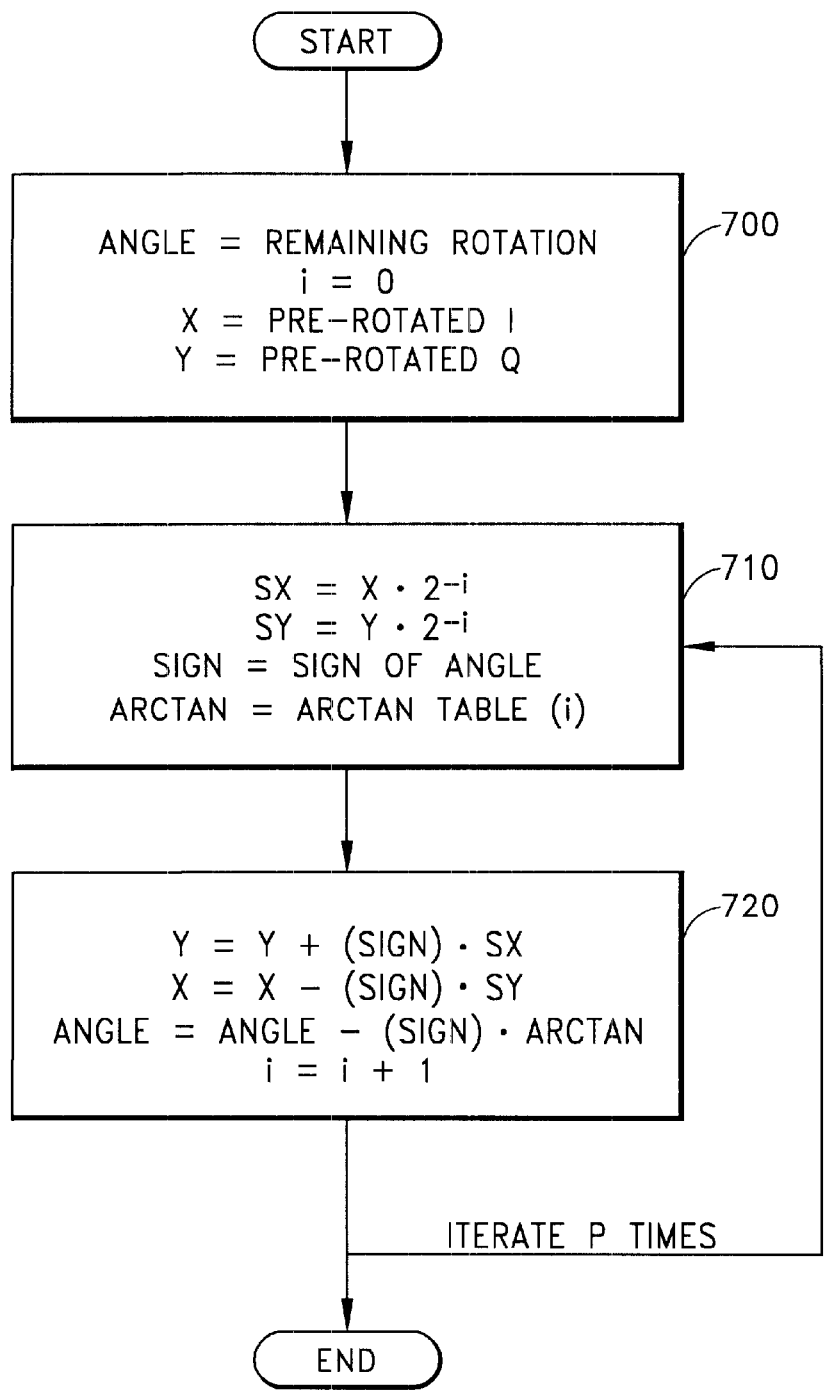
FIG. 7 is a flowchart of a process for computing complex number multiplication using the CORDIC algorithm.

FIG. 7 is a flowchart representing how the CORDIC algorithm operates as implemented by the CORDIC phase rotator 502. In a state 700, the X register 602, the Y register 604, and the angle register 606 are loaded with the pre-rotated (by 0, 90, 180, or 270 degrees) I-Q vector and the remaining rotation, respectively. Also, in the state 700, the contents of the counter 610, represented in the flowchart by a variable i, is set to zero. The process advances from the state 700 to a state 710.

In the state 710, the CORDIC phase rotator 502 computes the tan α component of the rotation, finds the direction of the rotation, and retrieves the amount of the rotation. Because the tan α component is determined to be a power of 2, computation of the tan α is a mere shift to the right by i bits and is denoted by SX and SY in the flowchart. SX and SY correspond to the contents of the first shift register 608 and the second shift register 612, respectively. In the first iteration, i=0, and hence there is no shift. The direction of the rotation is determined by whether the content of the angle register 606 stores a positive or negative number. In 2's complement notation, the most significant bit (msb) of the number indicates whether the number is positive or negative. Thus, the msb of the angle register 606 indicates whether the rotation iteration is positive or negative. For the particular iteration i, the CORDIC phase rotator 502 accesses the arc-tangent lookup table 614 to determine the amount of the rotation in degrees. The process advances from the state 710 to a state 720.

In the state 720, the CORDIC phase rotator 502 computes the rotated vector for the iteration. For a positive iterative rotation, SX is added to the content of the Y register 604; SY is subtracted from the content of the X register 602; the angle from the arc-tangent lookup table 614 is subtracted from the angle register 606; and the counter, indicated by "i," is incremented. Naturally, in a pipeline implementation, there is no such counter and i is simply hardwired.

For negative rotations, SX is subtracted from the content of the Y register 604; SY is added to the content of the X register 602; the angle from the arc-tangent lookup table 614 is added to the angle register 606; and the counter "i," is incremented.

Table II, below, illustrates a sample computation of a vector rotation using the CORDIC phase rotator 502. The vector initially is directed to Cartesian coordinates (0,1) and the desired rotation angle is 300 degrees. The values in the rows of Table II corresponding to CORDIC rotations are explained below in connection with FIG. 8.

TABLE II

| row | type | i | X | Y | APPLIED ROTATION ANGLE |
|---|---|---|---|---|---|
| 1 | initial | N/A | 0 | 1 | N/A 300 |
| 2 | pre-CORDIC rotation | N/A | 1 | 0 | 270 30 |
| 3 | CORDIC | 0 | 1 | 1 | ArcTan((1) −15 |
| 4 | CORDIC | 1 | 1.5 | 0.5 | −ArcTan(0.5) 11.5651 |
| 5 | CORDIC | 2 | 1.375 | 0.875 | ArcTan(0.25) −2.4712 |
| 6 | CORDIC | 3 | 1.4844 | 0.7031 | −ArcTan(0.125) 4.6538 |
| 7 | CORDIC | 4 | 1.4404 | 0.7959 | ArcTan(0.0625) 1.0775 |
| 8 | CORDIC | 5 | 1.4156 | 0.8409 | ArcTan(0.03125) −0.7124 |

Figure 8:
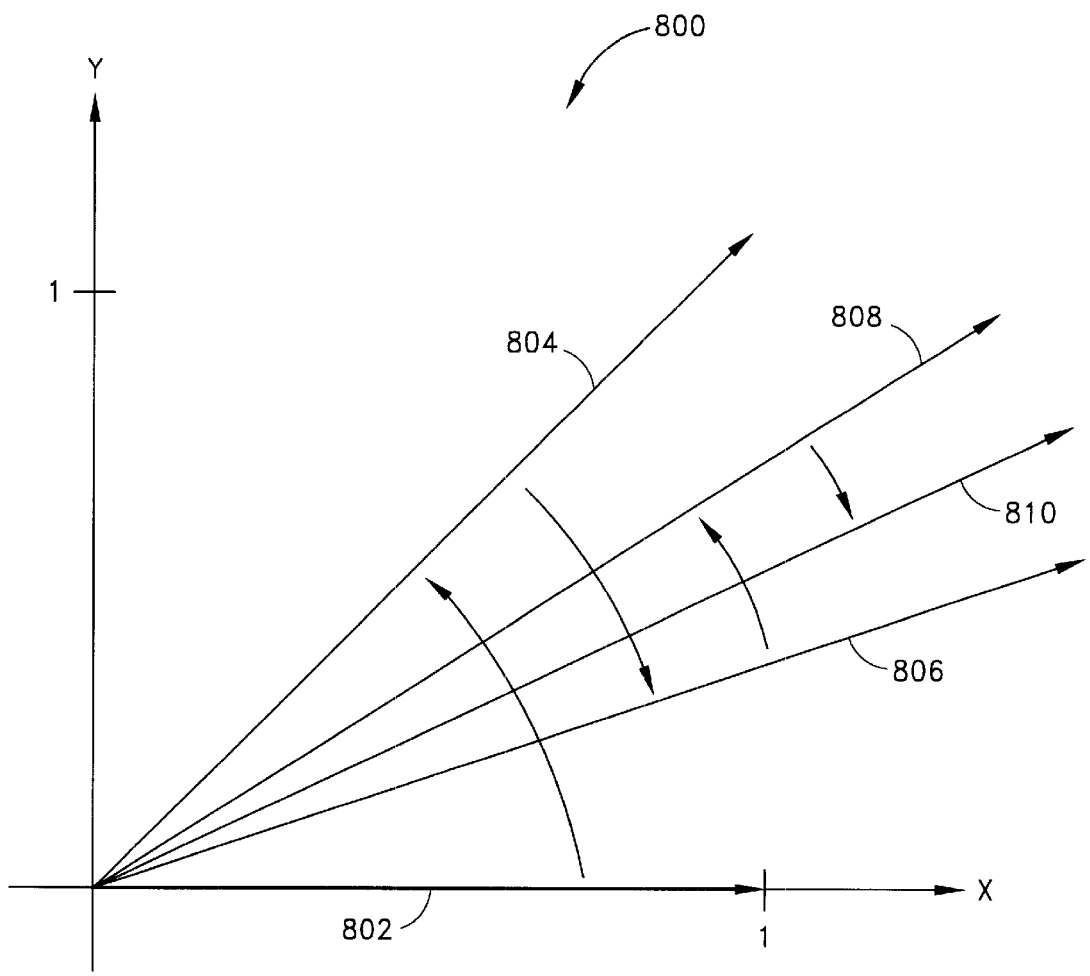
FIG. 8 is an illustration of a vector rotating in the complex plane in accordance with a CORDIC multiplication.

FIG. 8 graphically illustrates a CORDIC rotation in the complex plane as a series of small rotations. In FIG. 8, the CORDIC phase rotator 502 rotates a first vector 802 approximately 30 degrees to a fifth vector 810. The 30-degree angle corresponds to the same rotation angle remaining in the example from Table II after the pre-CORDIC rotation of 270 degrees has been performed. The first vector 802 corresponds to the initial position of the vector within the CORDIC phase rotator 502. The first vector 802 is located at Cartesian coordinates (1,0) as indicated by row 2 of Table II. After rotation to the first vector 802, the angle register 606 contains 300 degrees −270 degrees =30 degrees, which is positive and indicates that the next rotation (the first CORDIC rotation) is in the positive (counterclockwise) direction.

The second vector 804 indicates the results of the first CORDIC rotation as further detailed by row 3 of Table II. The second vector 804 is located at Cartesian coordinates (1,1) and has rotated from the first vector 802 by ArcTan (1)=45 degrees. The contents of the arctangent table 614 can be integers, e.g., milli-degrees. After rotation to the second vector 804, the angle register 606 contains 30−45=−15 degrees. Because the sign of −15 degrees is negative, the next rotation (the second CORDIC rotation) is in the negative (clockwise) direction. As illustrated by the second vector 804, a CORDIC rotation increases the magnitude of the rotated vector. The increase in magnitude will be examined in greater detail in connection with Table III.

A third vector 806 indicates the results of the second CORDIC rotation from the second vector 804. The third vector 806 corresponds to row 4 of Table II. The third vector 806 is located at Cartesian coordinates (1.5, 0.5) and has been rotated from the second vector 804 by −ArcTan(0.5)=−26.56505 degrees. After rotation to the third vector 806, the angle register 606 contains −15−(−26.56505)=11.56505 degrees. The sign of the content of the angle register 606 (11.56505 degrees) is positive, which indicates that the next CORDIC rotation is in the positive direction.

A fourth vector 808 indicates the results of the third CORDIC rotation from the third vector 806. The fourth vector 808 corresponds to row 5 of Table II. The fourth vector 808 is located at Cartesian coordinates (1.375, 0.875) and has been rotated from the third vector 806 by ArcTan (0.25)=14.03624 degrees. After rotation to the fourth vector 808, the angle register 606 contains 11.56505−14.03624=−2.47119 degrees. The negative sign of the content of the angle register 606 (−2.47119 degrees) indicates that the next CORDIC rotation is in the negative direction.

The fifth vector 810 indicates the results of the fourth CORDIC rotation from the fourth vector 808. The fifth vector 810 corresponds to row 6 of Table II. The fifth vector 810 is located at Cartesian coordinates (1.4844, 0.7031) and has been rotated from the fourth vector 808 by −ArcTan (0.125)=−7.12501 degrees. After rotation to the fifth vector 810, the angle register 606 contains −2.47119−(−7.12501)= 4.65383 degrees. The positive sign of the content of the angle register 606 (4.65383 degrees) indicates that the next CORDIC rotation would be in the positive direction. Rows 7 and 8 of Table II illustrate the results of further iterative CORDIC rotations from the vector 810, with each rotation bringing the resulting vector closer to the desired angle of 30 degrees with respect to the x-axis.

Of course, the precision of the CORDIC phase rotator 502 is dependent on many factors including the number of bits used to store the numbers. However, the number of iterations, denoted as P, through the CORDIC phase rotator 502 also controls the precision of the rotation. In noisy environments, the additional noise introduced to the Fourier Transform computation by a relatively imprecise CORDIC phase rotator 502 is minimal and the number of iterations required for a given signal to noise ratio can be small. In one embodiment, the CORDIC phase rotator performs 4 iterations.

After S(nT) has been rotated by the CORDIC phase rotator 502, the real component of the rotated S(nT) vector accumulates in the first coherent integration memory 504 and the imaginary component of the rotated S(nT) vector accumulates in the second coherent integration memory 506. As discussed earlier, the DFT correlator 500 does not accumulate the entire sequence but rather accumulates on a per tap basis to preserve the capability to identify the tap and hence the timing of the correlation event.

Acquisition of the PN signal occurs when the DFT correlator 500 identifies a correlation event having a correlation value greater than a predetermined threshold. When the Doppler frequency is close to matching the frequency of the bin, the correlation events sum on a tap in the relevant coherent integration and non-coherent integration memories and produce a peak. By contrast, when the Doppler frequency does not match the frequency of the bin, the effect is to spread the correlation events over multiple taps and reduce the peak stored within the memories.

The peak-search and detect 212 searches the non-coherent memory 510 for a tap with a correlation value greater than the predetermined threshold. The predetermined threshold is typically a compromise between detection and false detection. When the threshold is too high the DFT correlator 500 can fail to detect a correlation event when such correlation event occurs. When the threshold is too low, the DFT correlator 500 can indicate a correlation event when no such a correlation event actually occurred.

The magnitude change in the DFT incurred as a result of complex number multiplication by CORDIC rotation affects the magnitude of the DFT as computed by the DFT correlator 500. However, because the magnitude of all of the frequency bins of the DFT are affected by the same proportional amount, relative differences in correlation peaks are readily observable without additional circuitry. The magnitude gain of the CORDIC is also predictable, and in one embodiment is taken into account by proportionally increasing the predetermined threshold used in the peak-search and detect 212.

The growth in magnitude of a vector rotated by an implementation of the CORDIC algorithm will now be described. Each iteration through the CORDIC phase rotator 502 induces a predictable growth to the magnitude of the vector. The formula expressed below provides the gain of the magnitude through an iteration of the CORDIC phase rotator 502 where i=0 corresponds to the first iteration.

Gain=$\sqrt{1+2^{-2i}}$

The formula expressed below provides the total gain in magnitude through a number of iterations P through the CORDIC phase rotator 502.

$$Gain_P = \prod_{i=0}^{P-1} \sqrt{1+2^{-2i}}$$

Table III, below, illustrates the gain of the vector as a function of the total number of iterations, P.

TABLE III

| P | Gain |
| --- | --- |
| 1 | 1.4142 |
| 2 | 1.5811 |
| 3 | 1.6298 |
| 4 | 1.6425 |
| 5 | 1.6457 |
| 6 | 1.6465 |

As Table III indicates, the growth in magnitude of the vector is known prior to rotation. Thus, using "γ" to indicate a predetermined threshold chosen for a particular combination of detection and false alarm probability for a magnitude of a correlation event from the digital matched filter 202, then for a 4-rotation CORDIC, a predetermined threshold of 1.6425γ compensates for the gain of the CORDIC used for rotation. As will be discussed in more detail later, the magnitude detector 508 can also be implemented using a CORDIC and the predetermined threshold can be programmed to compensate for 2 magnitude growths due to processing with two CORDICs.

In one embodiment, a center-channel CORDIC phase rotator 512 is used to compute a zero frequency bin. One benefit of computing the zero frequency bin with the CORDIC is that the magnitude of the zero frequency bin grows by the same amount as the other frequency bins such that the peak-search and detect 212 can treat the zero-frequency bin in the same manner as the other bins.

In another embodiment, the DFT correlator 500 does not use the center channel CORDIC phase rotator 512 but rather adjusts for the magnitude gain by, for example, selecting a different predetermined threshold for the center channel, or by scaling the magnitude of the center channel, or by scaling the magnitude of the other channels, etc. An example of a simple shift-and-add sequence easily implemented in a circuit to approximate a division that compensates for the magnitude growth of a CORDIC rotation is as follows. A sequence of multiplication by 31, division by 32, multiplication by 5, and division by 8 approximately implements a division by 1.64 to return the magnitude of a vector to the vector's pre-CORDIC magnitude. It will be understood by one of ordinary skill in the art that, for example, a multiplication by 5 is implemented in a shift and add sequence by shifting the number to the left by 2 bits (multiplication by 4) and adding the shifted number to the original number. It will also be understood by one of ordinary skill in the art that a circuit compensating for the magnitude growth of a CORDIC phase rotator 512 compensate for the magnitude change either before or after the phase rotation.

FIG. 9 illustrates an alternative embodiment the DFT correlator 900 using an alternative embodiment of a complex number multiplier 901 wherein multiple complex number multiplies are simultaneously computed from a single CORDIC rotator. The DFT correlator 900 shown in FIG. 9 contains 3 DFT frequency bins, but it will be understood by one of ordinary skill in the art that an arbitrary number of frequency bins can be used. The DFT correlator 900 includes the peak-search and detect 212, the complex number multiplier 901, coherent integration memories 928, a multiplexer 924, the magnitude detector 508, a non-coherent integration memory 926, and the peak-search and detect 212. As will be explained in greater detail later, the DFT correlator 900 also staggers the coherent integration of different DFT bins to allow for a reduction to coherent integration memories 928 and to reuse the magnitude detector 508.

The complex number multiplier 901 includes a multiple-angle CORDIC phase rotator 902 and a plurality of angle selectors 904. An angle selector is part of the front end of a frequency bin. As previously indicated, the sequence of the directions of the rotations determines the final rotation angle. The direction of the rotation is the sign (positive or negative) of the angle. The multiple-angle CORDIC phase rotator 902 computes multiple rotations by computing both sign combinations at each rotation.

The multiple-angle CORDIC phase rotator 902 illustrated in FIG. 9 rotates the input vector by 8 angles within a range of approximately 90 degrees as indicated by Table IV, below. The angles indicate the relative amount of rotation added to the angle defined by the vector prior to rotation. Although Table IV shows a range of approximately 0 to 90 degrees, the same architecture easily ranges from approximately 0 to −90 degrees merely by taking the first rotation in the negative direction, i.e., −45 degrees. An embodiment of the CORDIC phase rotator can also perform a ±45 degree first rotation and hence span the range of −90 to 90 degrees.

TABLE IV

|  | ArcTan(1) | ArcTan(.5) | ArcTan(0.25) | ArcTan (0.125) | Relative Angle |
|---|---|---|---|---|---|
| $\alpha_0$ | 45 | 26.56505 | 14.03624 | 7.125016 | 92.72631 |
| $\alpha_1$ | 45 | 26.56505 | 14.03624 | −7.125016 | 78.47628 |
| $\alpha_2$ | 45 | 26.56505 | −14.03624 | 7.125016 | 64.65382 |
| $\alpha_3$ | 45 | 26.56505 | −14.03624 | −7.125016 | 50.40379 |
| $\alpha_4$ | 45 | −26.56505 | 14.03624 | 7.125016 | 39.59621 |
| $\alpha_5$ | 45 | −26.56505 | 14.03624 | −7.125016 | 25.34618 |
| $\alpha_6$ | 45 | −26.56505 | −14.03624 | 7.125016 | 11.52372 |
| $\alpha_7$ | 45 | −26.56505 | −14.03624 | −7.125016 | −2.72631 |

Figure 10A:
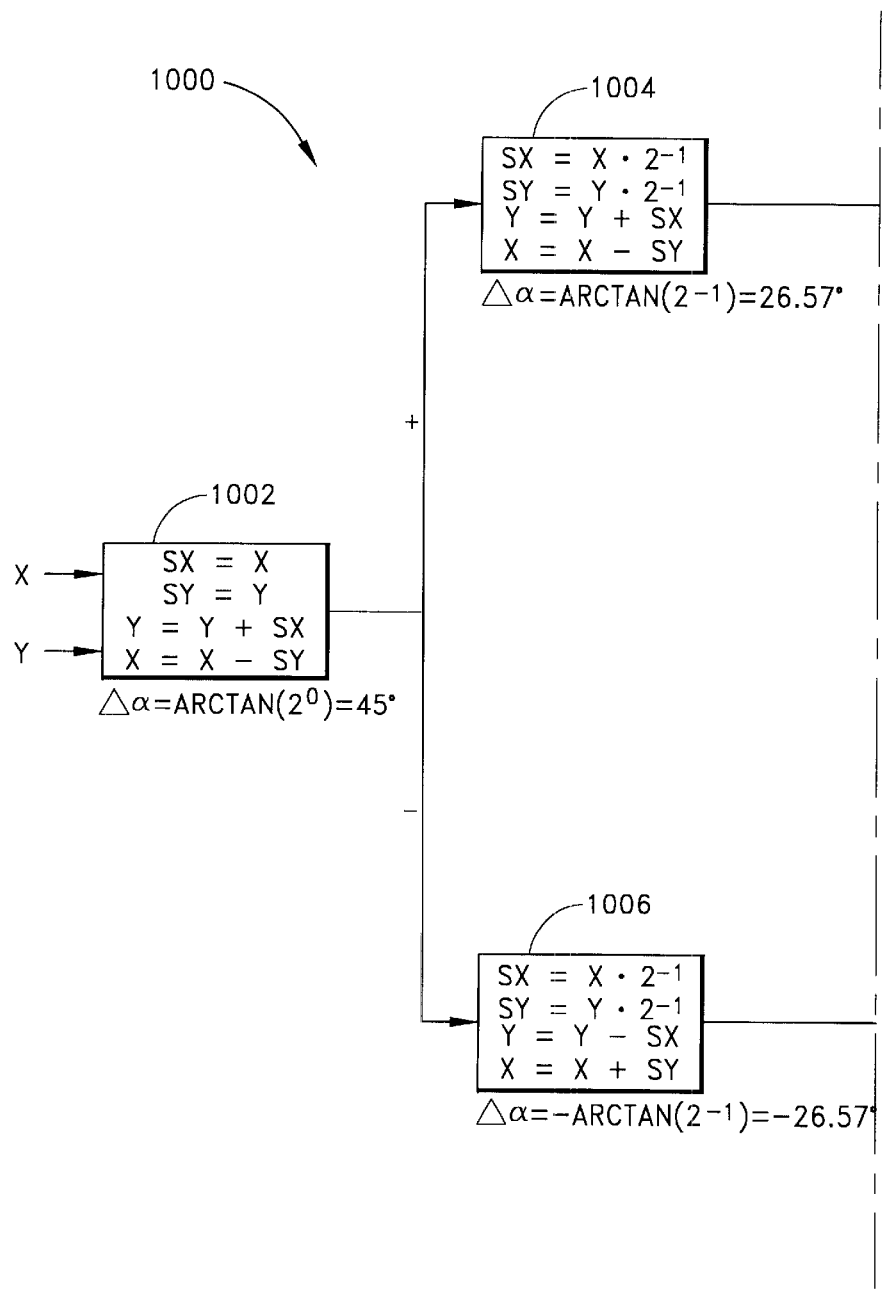
FIG. 10 consists of FIGS. 10A and 10B and illustrates an angle tree simultaneously computing multiple rotation angles.
Figure 10B:
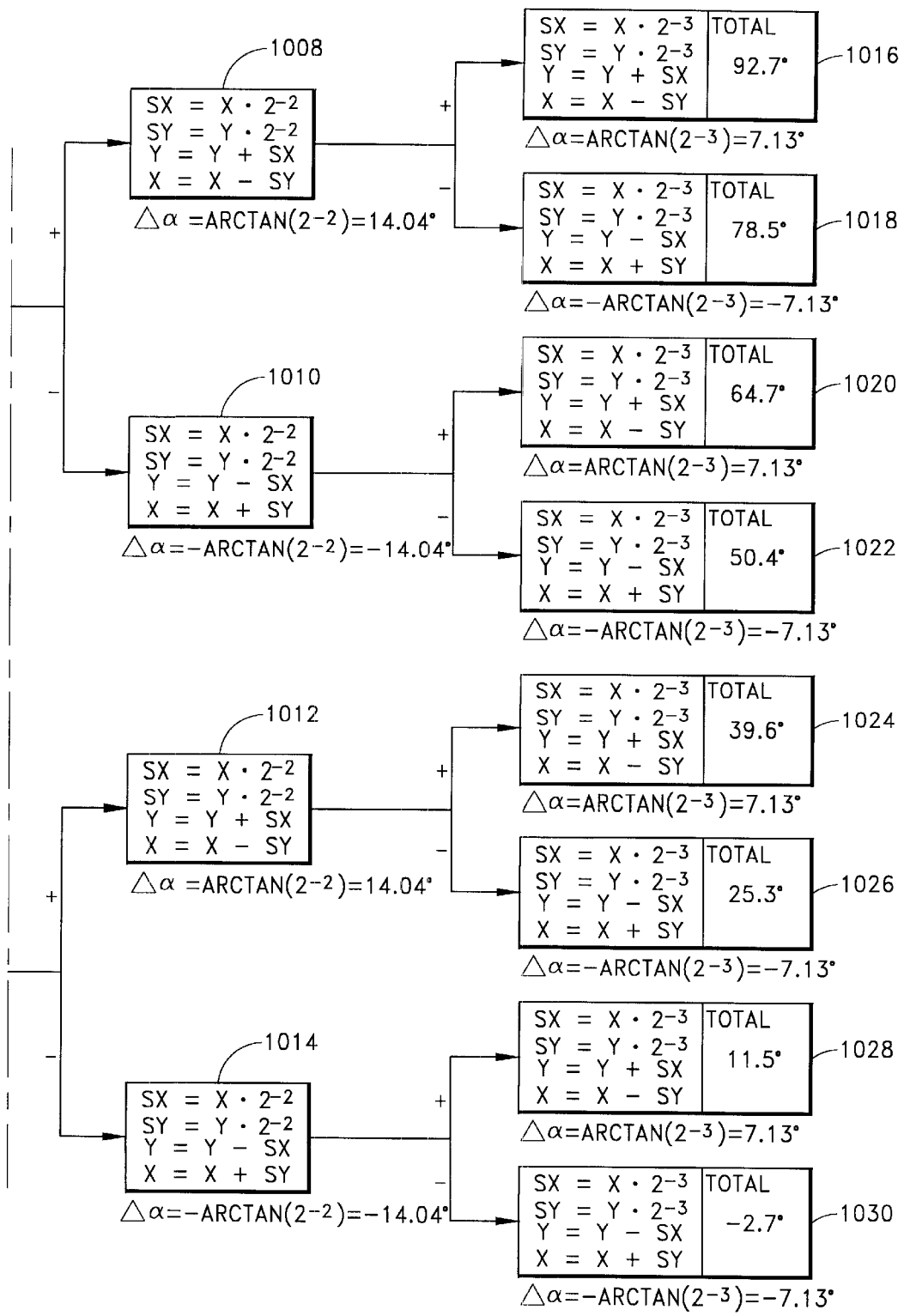

An angle tree 1000 illustrated in FIG. 10 indicates a sequence of shifts, adds and subtracts taken by the multiple-angle CORDIC phase rotator 902 to generate the rotations for the approximately 0 to 90 degree range. Again, the angles shown indicate the relative rotation made to the input vector. Each level in the tree represents a rotation within the multiple-angle CORDIC phase rotator 902 and exhibits the magnitude gain characteristic described in connection with Table III. Further iterations of angles can generate additional angles with finer resolution. For example, a fifth iteration results in 16 angles.

The angle tree 1000 shown implements a four-level multiple-angle rotation with a pipeline structure. The first rotator 1002 implements the first level of the rotation and rotates the input vector by 45 degrees. In one embodiment, the first level rotates the input vector by −45 degrees.

A second rotator 1004 and a third rotator 1006 perform the rotation for the second level. The second and third rotators 1004, 1006 receive the input vector as rotated by the first rotator 1002. The second rotator 1004 further rotates the input vector by 26.57 degrees. The third vector 1006 further rotates the input vector by −26.57 degrees. Thus, the outputs of the second rotator 1004 and the third rotator 1006 correspond to the input vector rotated by 71.57 and 18.43 degrees, respectively.

A fourth rotator 1008, a fifth rotator 1010, a sixth rotator 1012, and a seventh rotator 1014 perform the rotation for the third level. The fourth and fifth rotators 1008, 1010 receive the input vector as rotated by the first rotator 1002 and the second rotator 1004. The fourth rotator 1008 further rotates the input vector by 14.04 degrees. The fifth rotator 1010 further rotates the input vector by −14.04 degrees. The sixth and seventh rotators 1012, 1014 receive the input vector as rotated by the first rotator 1002 and the third rotator 1006. The sixth rotator 1012 further rotates the input vector by 14.04 degrees. The seventh rotator 1014 further rotates the input vector by −14.04 degrees. As such, the outputs of the fourth rotator 1008, the fifth rotator 1010, the sixth rotator 1012, and the seventh rotator 1014 correspond to the input vector as rotated by 85.6, 57.5, 32.5 and 4.4 degrees, respectively.

An eighth rotator 1016, a ninth rotator 1018, a tenth rotator 1020, an eleventh rotator 1022, a twelfth rotator 1024, a thirteenth rotator 1026, a fourteenth rotator 1028, and a fifteenth rotator 1030 perform the rotation for the fourth level. The eighth and ninth rotators 1016, 1018 receive the input vector as rotated by the first, second, and fourth rotators 1002, 1004, 1008 and further rotate the input vector by 7.13 and −7.13 degrees, respectively. The tenth and eleventh rotators 1020, 1022 receive the input vector as rotated by the first, second, and fifth rotators 1002, 1004, 1010 and further rotate the input vector by 7.13 and −7.13 degrees, respectively. The twelfth and thirteenth rotators 1024, 1026 receive the input vector as rotated by the first, third, and sixth rotators 1002, 1006, 1012 and further rotate the input vector by 7.13 and −7.13 degrees, respectively. The fourteenth and fifteenth rotators 1028, 1030 receive the input vector as rotated by the first, third, and seventh rotators 1002, 1006, 1014 and further rotate the input vector by 7.13 and −7.13 degrees, respectively. The outputs of the eighth rotator 1016, the ninth rotator 1018, the tenth rotator 1020, the eleventh rotator 1022, the twelfth rotator 1024, the thirteenth rotator 1026, the fourteenth rotator 1028, and the fifteenth rotator 1030 correspond to the input vector as rotated by 92.7, 78.5, 64.7, 50.4, 39.6, 25.3, 11.5, and −2.7 degrees, respectively.

The multiple angles produced by the multiple-angle CORDIC phase rotator 902 are presented to an angle selector, such as the first angle selector 906. The first angle selector 906 selects the appropriate angle for the DFT complex number multiplication corresponding to the first bin. The first angle selector 906 can be implemented with a multiplexer. In one embodiment, the selection by the multiplexer is controlled by a numerically controlled oscillator (NCO). The frequency of the NCO controls the rate of rotation and hence, the frequency of the corresponding DFT frequency bin.

The DFT computation requires complex number multiplies over the 0 to 360-degree range. Angles from 90 to 360 are computed from the 0 to 90-degree rotations by 90, 180, and 270-degree rotations as described in connection with Table I. One advantage of the multiple-angle CORDIC phase rotator 902 is a reduction in the redundancy of computations taken. The advantages of computing the DFT with the multiple-angle CORDIC phase rotator increase as the number of frequency bins, K, increases.

The DFT correlator 900 further illustrates reuse of the magnitude detector 508 and a reduction to coherent integration memories 928. The DFT correlator 900 advantageously staggers the start and stop times of the coherent integration memories 928 of different frequency bins.

In one embodiment, the analog-to-digital converters 122, 126 sample the I and Q signals for the P(Y) Code at 23.516 MHz, which is slightly higher than twice the code chip rate of 10.23 MHz. The samples also shift through the digital matched filter 202 at 23.516 MHz. With 2048 taps, the digital matched filter 202 completes a cycle at the rate of 23.516 MHz/2048=11.48 kHz. One embodiment of the digital matched filter 202 stores two reference codes in the reference code register 220 and completes a cycle at the rate of 23.516 MHz/1024=22.96 kHz.

One embodiment staggers the start and stop times of the coherent integration memories 928 by a multiple of the cycle from the digital matched filter 202. In one example, the stagger corresponds to 1/22.96 kHz=43.5 $\mu$S. Coherent integration generally lasts for approximately a 20 mS period or a sub-multiple thereof, such as 1, 2, 4, 5, and 10 milliseconds. Non-coherent integration can last several seconds. Thus, the relative effect of staggering coherent integration memories of different frequency bins is low.

Staggering the start time of coherent integration causes the stop time to stagger and will be illustrated by way of example. The coherent integration memories 928 include a first coherent integration memory 912, a second coherent integration memory 914, a third coherent integration memory 916, a fourth coherent integration memory 918, a fifth coherent integration memory 920, and a sixth coherent integration memory 922. The first and second coherent integration memories 912, 914 correspond to a first DFT bin. The third and fourth coherent integration memories 916, 918 correspond to a second DFT bin. The fifth and sixth coherent integration memories 920, 922 correspond to a third DFT bin. Pairs of coherent memories for one frequency bin are staggered from pairs of coherent memories for other frequency bins. There is no stagger between coherent integration memories that correspond to a common frequency bin (the I and Q memories for one bin).

If $t_0$ represents the time at which the first and second coherent integration memories 912, 914 start accumulating data, then $t_0$+43.5 $\mu$S represents the time at which the third and fourth coherent integration memories 916, 918 start accumulating data. Similarly, the fifth and sixth coherent integration memories 920, 922 start accumulating data at time $t_0$+87.1 $\mu$S.

The stop times of coherent integration are similarly staggered. If $t_1$ represents the time at which the first and second coherent integration memories 912, 914 finish accumulating data, then $t_1$+43.5 $\mu$S and $t_1$+87.1 $\mu$S respectively represent the time when the third and fourth coherent integration memories 916, 918 and the fifth and sixth coherent integration memories 920, 922 complete accumulation of data.

When the first and second coherent integration memories 912, 914 complete accumulating data, the integrate/dump control 930 commands the multiplexer 924 to couple the first and second coherent integration memories 912, 914 to the magnitude detector 508. The magnitude detector 508 converts the contents of the first and second coherent integration memories 912, 914 to magnitudes and accumulates the magnitudes in the non-coherent integration memory 926. The magnitude detector 508 is clocked by a 94.06 MHz system clock, which is 4 times the 23.516 MHz sampling frequency. The magnitude detector 508 is pipelined such that one magnitude is computed per period of the 94.06 MHz system clock. Thus, within the period of the stagger of 43.5 $\mu$S, the magnitude detector 508 computes the magnitudes of the content of the first and second coherent integration memories 912, 914 and accumulates the magnitudes in the non-coherent memory 926. As the contents of the first and second coherent integration memories 912, 914 are read into the magnitude detector 508, the memory locations are cleared (reset of accumulation) so that the first and second coherent integration memories 912, 914 can begin to accumulate new data. The integrate/dump control 930 directs the accumulation into the appropriate address in the non-coherent memory 926 and takes into account drift over tap position as described in connection with FIG. 14. One embodiment of the non-coherent memory 926 includes the Doppler corrected memory 650 illustrated in FIG. 14, except that the data multiplexer 658 is not needed.

When the third and fourth coherent integration memories 916, 918 complete accumulating data shortly thereafter, the integrate/dump control 930 commands the multiplexer 924 to couple the third and fourth coherent integration memories 916, 918 to the magnitude detector 508. The system repeats the process of converting to magnitude, clearing the read memory locations, and accumulating the magnitudes in the non-coherent memory 926 within the 43.5 $\mu$S stagger.

Similarly, when the fifth and sixth coherent integration memories 920, 922 complete accumulating data, the integrate/dump control 930 couples the multiplexer 924 to the fifth and sixth coherent integration memories 920, 922. The magnitude detector 508 again converts the contents of the fifth and sixth coherent integration memories 920, 922 into magnitude, clears the read locations of the fifth and sixth coherent integration memories 920, 922, and accumulates the magnitudes in the non-coherent memory 926.

Staggering the timing of the integration of the coherent memories and multiplexing to the magnitude detector 508 advantageously allows the system to employ one magnitude detector 508 for all the frequency bins. In another embodiment where no stagger is employed, the size of each of the coherent integration memories 928 is at least 2N instead of N. By double buffering and doubling the size of the coherent integration memory 928, a single magnitude detector 508 can also be reused to compute the magnitudes of the coherent integration results for all the frequency bins.

The use of the CORDIC algorithm to compute the magnitude of a vector will now be described. The magnitude detector 508 uses a CORDIC algorithm to compute the magnitude of a vector stored in the coherent memories 504, 506. Representing a vector in the coherent memories 504, 506 as x+jy, the magnitude of the vector follows from the familiar Pythagorean equation:

Magnitude=$\sqrt{x^2+y^2}$

To compute the magnitude of the vector, the magnitude detector 508 rotates the vector such that the vector lies on the x-axis. Then, the x-component of the vector contains the magnitude of the vector. With the vector rotation implemented through a CORDIC algorithm, the x-component of the rotated vector also incurs a magnitude gain as previously described in connection with Table III.

Figure 11:
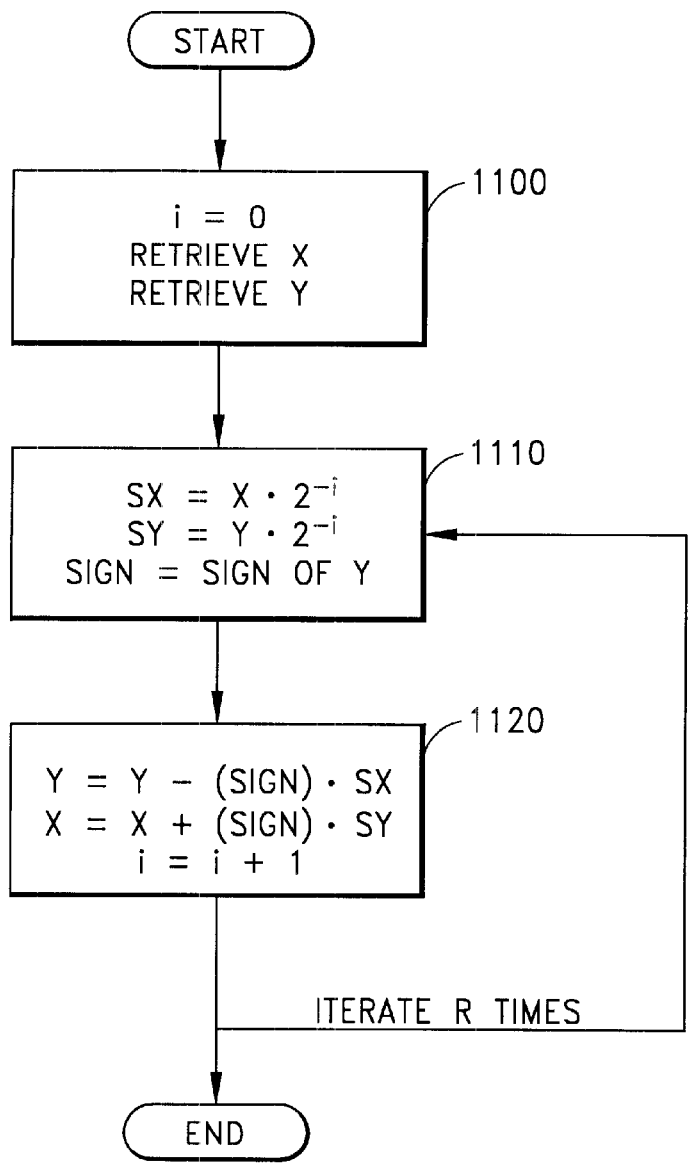
FIG. 11 is a flowchart of a process for computing the magnitude of a vector using the CORDIC algorithm.

FIG. 11 is a flowchart representing the use of the CORDIC algorithm to compute the magnitude of a vector. It will be understood by one of ordinary skill in the art that a circuit implementing the flowchart of FIG. 11 can compute the vector rotations in an iterative fashion or as states in a pipeline. In a state 1100, the magnitude detector 508 retrieves the vector and stores the real part in an X register and the imaginary part in an Y register. The counter i is cleared to zero. The process advances from the state 1100 to a state 1110.

In the state 1110, the magnitude detector 508 calculates the SX and SY components (the tan α components) by shifting X and Y i bits to the right. Note that the first iteration corresponds to i=0, which is no shift. The sign of Y controls the direction of the rotation of the vector. When X is positive (quadrants I and IV), a positive Y rotates the vector in a negative or clockwise direction. When X is negative (quadrants II and III), a positive Y rotates the vector in a positive or counterclockwise direction. In either case, the vector rotates in a direction towards the x-axis. The process advances from the state 1110 to a state 1120.

In the state 1120, the rotated vector is calculated and i is incremented. Of course, in a pipeline implementation, i is preferably hardwired. The process is repeated up to a desired level of precision. In one embodiment, the number of iterations of the algorithm, R, is 5. The following equations reveal the calculations performed by the state 1120:

$$Y=Y-(SIGN)SX$$

$$X=X+(SIGN)SY$$

After the magnitude detector 508 has processed the vector, the X register holds the magnitude of the vector multiplied by the gain of the CORDIC. If the sign of X is negative, X can be inverted to provide a positive magnitude. In the case of 2's complement representation of numbers, a number is inverted by negating the individual bits (1's complement) and adding 1. The gain of the magnitude detector 508 as implemented through the CORDIC can be taken into account in the peak-search and detect 212. In the case where a CORDIC implementation has been used for complex number multiplication and a CORDIC implementation has been used for magnitude calculation, the peak-search and detect 212 can compensate for 2 CORDIC gains. For example, if γ represents the gain of 1 CORDIC (approximately 1.64), then $\gamma^2$ (approximately 2.7) is the gain of 2 CORDIC implementations. One embodiment compensates for the gain of the CORDIC magnitude detector 508 through a shift-and-add division algorithm. Other methods of computing or approximating the magnitude of a vector include the use of lookup tables, direct computation by square root of sum of squares, and approximation by sum of absolute values.

Figure 12A:
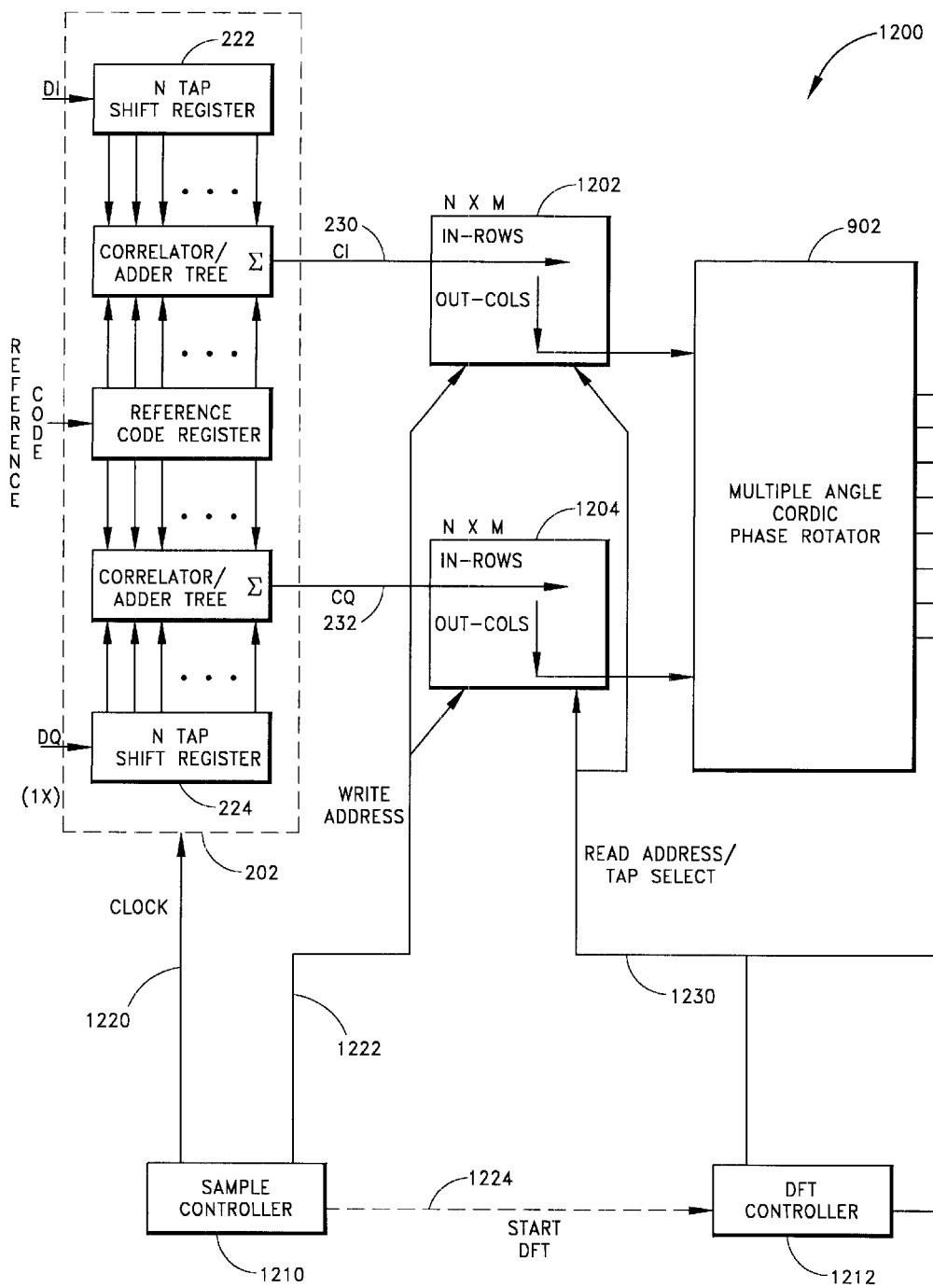
FIG. 12 consists of FIGS. 12A and 12B and illustrates a correlator implemented with a DFT including input memory ahead of the computation.
Figure 12B:
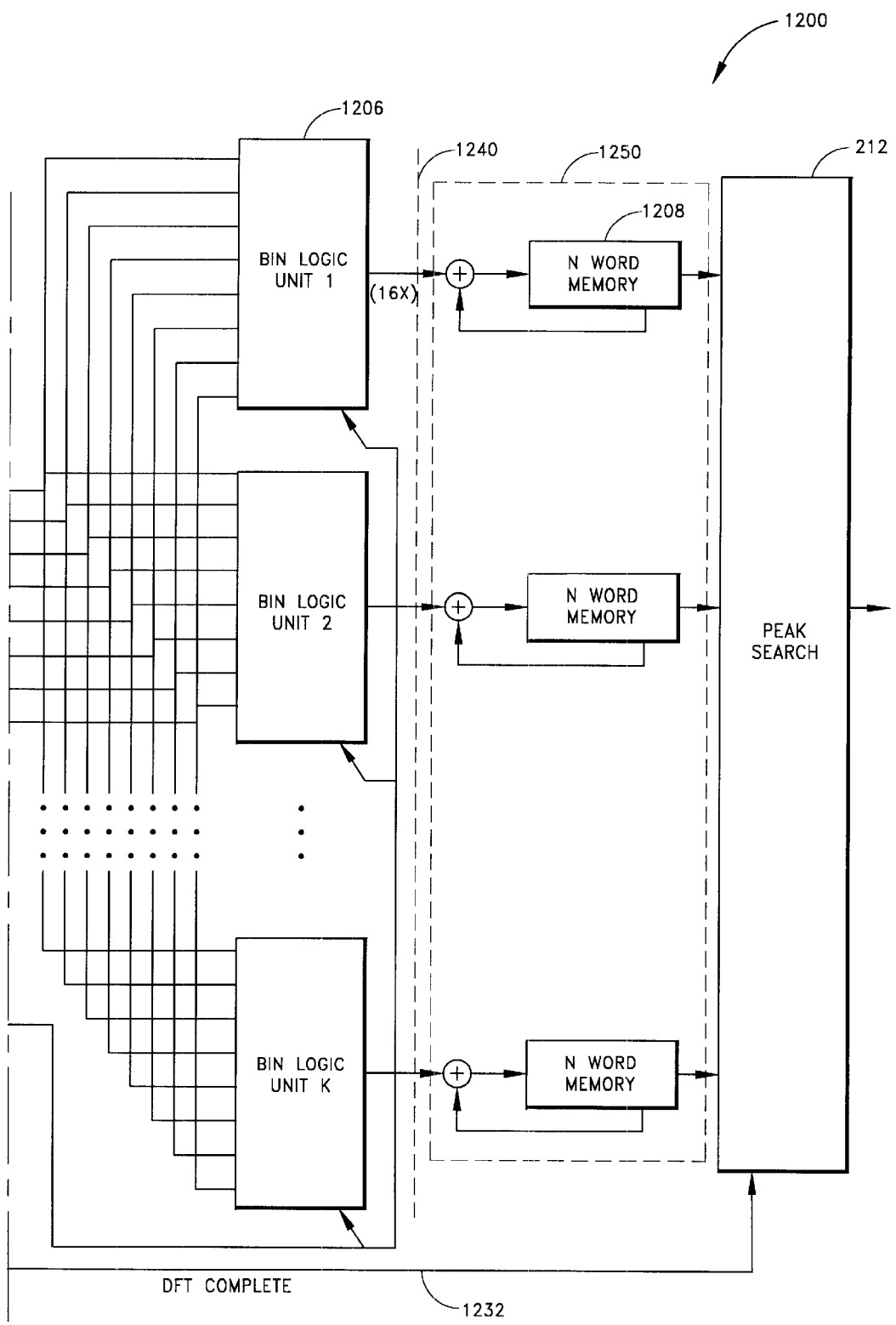

FIG. 12 illustrates an embodiment of a correlator 1200, which also computes the Fourier Transform with a DFT. The correlator 1200 advantageously combines input memory with the multiple-angle CORDIC phase rotator 902 for a dramatic reduction in total system memory and logic.

The correlator 1200 includes the digital matched filter 202, a first input memory 1202, a second input memory 1204, a multiple-angle CORDIC phase rotator 902, a bin logic unit 1206, a non-coherent integration memory 1208, a sample controller 1210, a DFT controller 1212, and a peak-search and detect 212. The placement of the first input memory 1202 and the second input memory 1204 ahead of the complex number multiplication can significantly reduce the amount of coherent integration memory used by the correlator 1200 to compute the DFT by reducing the replication of stored data.

A DFT approach allows a designer to select the number and spacing of the frequency bins arbitrarily. In one embodiment, the bin logic unit 1206 and the non-coherent integration memory 1208 are paralleled with other bin logic units and non-coherent integration memories as shown in FIG. 12. FIG. 12 indicates the presence of "K" of such frequency bins. As the number of frequency bins increases, the effect of placing input memory ahead of the complex number multiplication yields greater savings to total system memory and logic.

The digital matched filter 202 is described in connection with FIG. 2A. Again, a GPS receiver can include multiple digital matched filters 202 and multiple correlators 1200 to search for multiple satellite codes in parallel.

The computation of one frequency bin will now be described. The digital matched filter 202 outputs the signals CI 230 and CQ 232. The CI signal 230 is stored by the first input memory 1202. Conceptually, the first input memory 1202 stores the CI signal for a cycle of a PN Code in a row of memory. Multiple cycles of the CI signal are stored in multiple rows within the first input memory 1202. Similarly, the second input memory 1204 stores the CQ signal 232. The sample controller 1210 controls the clocking of the shift registers 222, 224 in the digital matched filter 212 via the clock signal 1220. In one embodiment, the clock signal 1220 is divided from an output of the local oscillator 112. The write address output 1222 of the sample controller 1210 arranges the sampled data into the rows as described above. When a set of sequences has been stored into the input memories 1202, 1204, the sample controller activates a start DFT signal 1224 to the DFT controller 1212, to provide an indication that the DFT can be computed. In one embodiment, the clock signal 1220, which controls the clocking rate of the shift registers 220, 226, differs from the rate at which the correlator computes the DFT. In one example, if 1× represents the rate of clock signal 1220, then a rate at which the correlator accesses and processes data from the input memories 1202, 1204 is 16×.

One embodiment further integrates rows of data in the first input memory 1202 and the second input memory 1204 to reduce the size of the first input memory 1202 and the second input memory 1204. Of course, the presence of integration ahead of the computation of the Fourier Transform would introduce the somewhat undesirable (sin x)/x magnitude response characteristic to the computed transform. The (sin x)/x magnitude response 404 discussed in connection with FIG. 4, makes it more difficult to detect the presence of a frequency offset because the magnitude response between frequency bins is not uniform. A system with the (sin x)/x magnitude response can exhibit lower performance and require additional computations to compensate for the uneven magnitude response.

Conceptually, the multiple-angle CORDIC phase rotator 902 accesses the contents of the first input memory 1202 and the second input memory 1204 by columns. Each column contains the results of correlation through the digital matched filter at a tap position along the correlator tree. The DFT controller 1212 controls the read address from the input memories 1202, 1204 via read address/tap select 1230 such that a first series of data for a first tap position from the input memories 1202, 1204 is accessed, then a second series of data for a second tap position is accessed, and so on. Thus, the multiple-angle CORDIC phase rotator 902 retrieves data from the input memories not in the time sequence of the data but, rather, one tap at a time. As previously noted, the computation of a Fourier Transform by DFT allows the accessing of data without regard to order.

The data accessed in columns also forms a vector. The vector is a complex number sum of a real part and an imaginary part where the real part is the output of the first input memory 1202 and the imaginary part is the output of the second input memory 1204. The multiple-angle CORDIC phase rotator 902 takes the vectors from the input memories and rotates the vectors in multiple angles within 90 degrees as discussed in the description of FIG. 9. In another embodiment, the multiple angle rotation is retrieved from a memory cell. For example, a content of the input memories 1202, 1204 can address a ROM, which, at a memory location indicated by the content, 1202, 1204 contains pre-calculated products of a vector corresponding to the content of the input memories 1202, 1204.

The bin logic unit 1206 selects the appropriate angle from the multiple angles presented by the multiple-angle CORDIC phase rotator 902. The appropriate angle is the angle that is used to compute the DFT rotation of $e^{j\omega T}$. The read address/tap select 1230 can indicate the angle that is used to compute the DFT rotation. In one embodiment, the multiple-angle CORDIC phase rotator 902 provides rotations spanning approximately 90 degrees relative to the initial angle of the output of the correlator trees. The angle selected by the bin logic unit 1206 then corresponds to an angle that, with an additional phase shift of 90, 180, or 270 degrees, matches the angle of the DFT computation. Another embodiment computes the additional 90, 180, and 270-degree rotations within the multiple-angle CORDIC phase rotator 902.

A register within the bin logic unit 1206 accumulates the DFT sum for the tap. The bin logic unit 1206 will be described in greater detail in connection with FIG. 13. By accessing the input memories by taps, rather than by samples, the coherent integration memory within the bin logic unit 1206 can be advantageously reduced to one register for the real component of the DFT and one register for the imaginary component of the DFT. By contrast, the DFT correlator 500 illustrated in FIG. 5 uses N registers for the real component of the DFT and N registers for the imaginary component of the DFT, where N is the number of taps. Thus, the DFT correlator 500 uses 2N registers to store the coherent integration for each DFT frequency bin. In one embodiment, there are 2048 taps (A) and 16 DFT frequency bins. It can be readily observed that the potential reduction of memory size is substantial.

When the bin logic unit 1206 has computed the complex number components of DFT for a tap, the bin logic unit 1206 converts the vector (complex number) to a scalar value (magnitude). The CORDIC algorithm presents one method of converting the vector to a scalar value and has been described in connection with FIG. 11. Following conversion of the vector to a scalar value, the scalar quantity is stored in the non-coherent integration memory 1208. A line 1240 indicates where the DFT is available. The non-coherent integration memory 1208 accumulates the magnitude of the DFT on a tap-by-tap basis in accordance with compensation for the drift in tap position described in connection with FIG. 5. A set of non-coherent memories 1250 can contain the frequency-time array described in connection with FIG. 2B.

When a DFT computation is complete, the DFT controller activates a DFT complete signal 1232, which indicates to the peak-search and detect 212 that a memory location in the non-coherent memory 1208 is ready to be tested for correlation.

Figure 13:
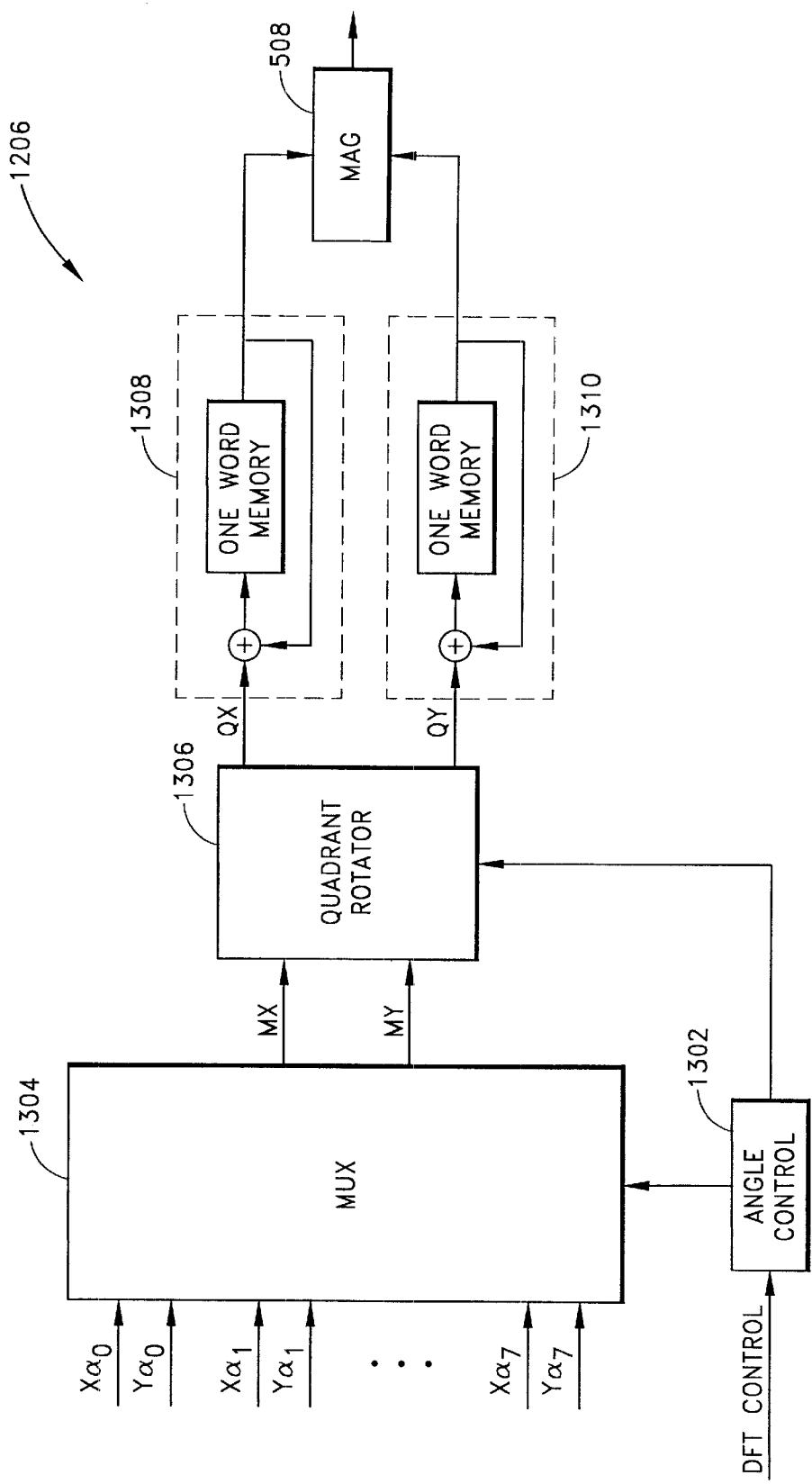
FIG. 13 illustrates a bin logic unit.

FIG. 13 illustrates a preferred embodiment of the bin logic unit 1206 in more detail. The bin logic unit 1206 includes an angle control 1302, a multiplexer 1304, a quadrant rotator 1306, a first accumulator 1308, a second accumulator 1310, and a magnitude detector 508. The angle control 1302 receives a DFT control from the DFT controller 1212. The angle control 1302 controls the selection by the multiplexer 1304 and the rotation by the quadrant rotator 1306.

The multiplexer 1304 selects an output from the multiple-angle CORDIC phase rotator 902. The multiple-angle CORDIC phase rotator 902 outputs include the x-component and the y-component of the rotated vector. In one embodiment, the multiplexer 1304 is implemented with tristateable buffers.

The quadrant rotator 1306 receives the output of the multiplexer 1304. The output of the multiplexer is indicated by MX and MY. The quadrant rotator also receives a control from the angle control 1302 and can rotate the output of the multiplexer 1304 by an increment of 90 degrees to conform the output (QX, QY) of the quadrant rotator 1306 to the DFT rotation. Rotation by an increment of 90 degrees is described in connection with Table I.

The accumulators 1308, 1310 coherently integrate the DFT over a tap. In one embodiment with input memory where the data to the correlator 1200 is accessed tap-by-tap, the memory in the accumulators 1308, 1310 can be implemented with one memory instead of N memories, where N is the number of taps. The memory is reset when the DFT computation proceeds to a new tap.

The magnitude detector 508 computes the magnitude of the coherently integrated DFT of the tap. One embodiment of the magnitude detector 508 is described in connection with FIG. 11.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A correlation circuit for acquiring a pseudorandom noise (PN) code signal, the correlation circuit comprising:

a digital matched filter adapted to receive a reference code, a first detected code, and a second detected code, the digital matched filter shifting the first and second detected codes along a first and a second shift register, the first and second shift registers containing taps such that a comparison circuit compares the reference code to the first and second code as accessed through the taps, the comparison circuit generating a first output and a second output where the first output peaks when the first detected code substantially matches the reference code and where the second output peaks when the second detected code substantially matches the reference code;

a Coordinate Rotation Digital Computer (CORDIC) phase rotator circuit adapted to receive the first and second outputs of the digital matched filter, where the first and second outputs of the digital matched filter are represented as x and y components of a sequence of vectors in a complex plane, the CORDIC phase rotator circuit performing a rotation to the sequence of vectors such that the rotation results in a complex multiplication to the sequence of vectors in a Discrete Fourier Transform (DFT);

a first coherent memory adapted to receive a real part of the complex multiplication result from the CORDIC phase rotator circuit, the first coherent memory further adapted to relate the complex multiplication result to an address in the first coherent memory where the address corresponds to a position of a tap in the digital matched filter where the tap position indicates a relative position of the first detected code within the digital matched filter; and a second coherent memory adapted to receive an imaginary part of the complex multiplication result from the CORDIC phase rotator circuit, the second coherent memory relating the complex multiplication result to an address in the second coherent memory where the address corresponds to a position of a tap in the digital matched filter where the tap position indicates a relative position of the second detected code within the digital matched filter.

2. The correlation circuit as defined in claim 1, further including an integration circuit, the integration circuit adapted to accumulate the real part of the complex multiplication result with a content of the first coherent memory related to the tap position and accumulate the imaginary part of the complex multiplication result with a content of the second coherent memory related to the tap position.

3. The correlation circuit as defined in claim 2, wherein the CORDIC phase rotator circuit further includes a quadrant rotating circuit which rotates the vector in the CORDIC by an integer multiple of 90 degrees.

4. The correlation circuit as defined in claim 2, wherein the CORDIC phase rotator comprises a plurality of CORDIC phase rotators, the first coherent memory comprises a first plurality of coherent memories, the second coherent memory comprises a second plurality of coherent memories, where the plurality of CORDIC phase rotators rotate the outputs of the digital matched filter in a DFT manner, and where at least one CORDIC phase rotator from the plurality of CORDIC phase rotators changes angles at a rate that is different from a rate at which the other CORDIC phase rotators change angles such that the at least one CORDIC phase rotator performs a DFT computation at a different frequency than the other CORDIC phase rotators.

5. The correlation circuit as defined in claim 1, wherein a number of taps of the first shift register and a number of memory addresses for the first coherent memory are equal.

6. The correlation circuit as defined in claim 1, where the first coherent memory and the second coherent memory are combined into one memory.

7. The correlation circuit as defined in claim 1, where the CORDIC phase rotator computes a plurality of rotations with a plurality of outputs, the correlation circuit further comprising an angle selector adapted to receive the plurality of outputs and to select the output with a phase characteristic that corresponds to an integer multiple of 90 degrees of the DFT multiplication, the angle selector further adapted to rotate the selected output by the integer multiple of 90 degrees so that the rotated selected output corresponds to the DFT multiplication.

8. The correlation circuit as defined in claim 1, further comprising:
a magnitude detection circuit adapted to retrieve a first content from the first coherent memory and a second content from the second coherent memory, the first content and the second content related to the same tap, the magnitude detection circuit computing a magnitude output predictably related to the magnitude of a vector defined by the first content and the second content where the magnitude is a square root of the sum of the squares of the first content and the second content; and
a non-coherent integration memory adapted to receive and accumulate the magnitude output of the magnitude detection circuit where the non-coherent integration accumulates the magnitude output with a content of the non-coherent memory at an address of the non-coherent memory related to the tap position and a frequency of the DFT computation corresponding to the magnitude output.

9. The correlation circuit as defined in claim 8, wherein the non-coherent integration memory comprises a plurality of non-coherent integration memories, where the plurality of non-coherent integration memories are coupled to at least one magnitude detection circuit such that contents of the plurality of non-coherent integration memories relate to magnitudes of the contents of the first and second pluralities of coherent memories, the correlation circuit further comprising a peak detector coupled to the plurality of non-coherent integration memories, the peak detector adapted to retrieve the contents of the non-coherent integration memories, compare the contents of the non-coherent integration memories to a predetermined threshold, and provide an indication when at least one content from the contents of the non-coherent integration memories exceeds the predetermined threshold.

10. The correlation circuit as defined in claim 8, wherein the non-coherent integration memory further comprises:
a counter adapted to provide a count related to an accumulated number of tap positions by which a code signal with a frequency offset has shifted relative to a time index signal; and
an adder circuit adapted to apply the time index signal to the counter output and use the result to address the non-coherent integration memory.

11. The correlation circuit as defined in claim 8, further comprising:
an offset occurrence circuit adapted to receive a clock signal and to provide an indication with a period related to an inverse of a product of a frequency computation associated with the at least portion of the non-coherent integration memory;
a counter circuit adapted to accumulate indications provided by the offset occurrence circuit, where an output of the counter circuit is termed a time offset signal; and
an adder circuit adapted to sum a time index signal with the time offset signal, where the time index signal relates to a memory address with no code drift, where an output of the adder circuit is applied to the address of the non-coherent integration memory such that a memory location indicated by the output of the adder circuit is synchronized with the code.

12. The correlation circuit as defined in claim 1, wherein the CORDIC phase rotator further comprises:
a first rotation circuit, where the first rotation circuit rotates a vector from the sequence of vectors by a first angle, where an absolute value of the first angle is defined by an arctangent of a first power of 2; and
a second rotation circuit coupled to an output of the first rotation circuit, where the second rotation circuit rotates the output of the first rotation circuit in two separate rotations, where the two separate rotations rotate in opposite directions, where the two separate rotations are further characterized by having an angle of rotation with an absolute value defined by an arctangent of a second power of 2, where the second power of 2 is one less than the first power of 2.

13. The correlation circuit as defined in claim 1, further comprising:
an integrate and dump control circuit adapted to sequence the start of the first coherent integration memory and the second coherent integration memory and to sequence the outputs of the first coherent integration memory and the second coherent integration memory in a sequential manner, where the integrate and dump control circuit is configured to reset a memory location after the memory location has been accessed; and
a multiplexer circuit coupled to the first coherent integration memory and to the second coherent integration memory, where the multiplexer circuit is configured to select between an output of the first coherent integration memory and an output of the second coherent integration memory based on which output is outputting data.

14. A method for detecting correlation in a spread spectrum pseudorandom noise receiver, the method comprising:

comparing a first detected code and a second detected code to a reference code and generating a first output and a second output in a digital matched filter, where the first and second outputs are respective summations of comparisons between the first detected code and the reference code and comparisons between the second detected code and the reference code;

generating a product by multiplying a first number by a second number, where the first number is defined by the first output and the second output where the first output corresponds to a real part of the first number and the second output corresponds to an imaginary part of the first number, and where the second number corresponds to an $e^{j\omega T}$ term from a DFT computation; and maintaining the product of the multiplication such that products of multiplies pertaining to a tap in the digital matched filter are identifiably maintained separately from products of multiplies of other taps.

15. The method as defined in claim 14, wherein the multiplying is performed in accordance with a Coordinate Rotation Digital Computer (CORDIC) algorithm.

16. The method as defined in claim 14, further comprising accumulating the product of the multiplication with a further product of multiplies where the product and the further product are related to the tap in the digital matched filter.

17. The method as defined in claim 16, further comprising:

converting the accumulated product of the multiplication into a scalar value representing a magnitude of the accumulated product;

generating an accumulation by accumulating the scalar value with other scalar values where the scalar value and the other scalar values are related by the tap position in the digital matched filter and frequency of the DFT computation; and storing the accumulation in a collection of elements.

18. The method as defined in claim 17, further comprising:

searching the collection;

comparing the elements of the collection to a predetermined threshold; and providing an indication when an element of the collection is at least as high as the predetermined threshold.

19. The method as defined in claim 18, further comprising:

receiving a time index signal, where the time index signal relates to addresses of elements of the collection;

receiving an offset signal, where the offset signal is approximately related to an inverse of a product of a frequency computation associated with the collection and a number of elements per code chip;

applying the time index signal to the time offset signal to generate a compensated signal;

applying the compensated signal to the collection to retrieve a first accumulation;

summing the first accumulation with a sample to generate a second accumulation; and storing the second accumulation in the collection to correct for code drift in the collection.

20. The method as defined in claim 17 wherein the collection of elements is an addressable memory device.

21. The method as defined in claim 14, further comprising:

simultaneously generating multiple products of the first number and the second number;

maintaining the multiple products in Cartesian coordinate form as the multiple products are generated and rotate in a complex plane;

generating the multiple products by rotating the first number in a series of stages, where a second stage rotates a result of a first stage by an angle where an absolute value of the angle is an arctangent of a power of 2, wherein the power of 2 for the second stage is one less than the power of 2 for the first stage; and calculating, in the second stage, both positive and negative rotations of a multiplicand such that more than one multiplication product is computed.

22. The method as defined in claim 14, wherein the DFT computation further comprises:

maintaining multiple periods of the first output and the second output of the digital matched filter in a collection;

reading data from the collection in an order such that the data is extracted from a common point within a period;

multiplying the data in accordance with a DFT algorithm; and accumulating the multiplied data.

23. A correlation circuit for acquiring a pseudorandom noise (PN) code signal, the correlation circuit comprising:

a comparison circuit;

a digital matched filter adapted to receive a reference code, a first detected code, and a second detected code, the digital matched filter shifting the first and second detected codes through a first and a second shift register, the first and second shift registers containing taps such that the comparison circuit compares the reference code to the first and second code as accessed through the taps, the comparison circuit generating a first output and a second output where the first output peaks when the first detected code substantially matches the reference code and the second output peaks when the second detected code substantially matches the reference code;

a multiplier circuit adapted to receive the first and second outputs of the digital matched filter, where the multiplier circuit computes a plurality of complex multiplication products of a complex number defined by the first and second output, the plurality of products spanning a first angular range relative to the complex number defined by the first and second output;

an angle selector coupled to the multiplier circuit, where the angle selector receives the plurality of products and is adapted to select the product from the plurality of products with the rotation that corresponds to an angle indicated by a DFT computation;

a first coherent integration memory adapted to receive and accumulate real parts of the complex multiplication result from the multiplier circuit, the first coherent integration memory relating the complex multiplication result to an address in the first coherent integration memory, where the address in memory corresponds to a position of a tap in the digital matched filter, where the tap position indicates a relative position of the first detected code within the digital matched filter, the first coherent integration memory further accumulating real parts of the complex multiplication products with a content of the first coherent integration memory at the memory address indicated by the tap position; and a second coherent integration memory adapted to receive and accumulate imaginary parts of the complex multiplication products from the multiplier circuit, the second coherent integration memory relating the complex multiplication products to an address in the second coherent integration memory, where the address corresponds to a position of a tap in the digital matched filter, where the tap position indicates a relative position of the first detected code within the digital matched filter, the second coherent integration memory further accumulating the imaginary parts of the complex multiplication products with a content of the second coherent integration memory at the memory address indicated by the tap position.

24. The correlation circuit as defined in claim 23, wherein the first range is approximately 90 degrees.

25. The correlation circuit as defined in claim 23, wherein the angle selector selects a product from the plurality of products corresponding to an integer multiple of 90 degrees of the angle indicated by a DFT computation, and is further adapted to rotate the selected product by the integer multiple of 90 degrees so that the rotated selected output corresponds to the DFT computation.

26. The correlation circuit as defined in claim 23, wherein the multiplier circuit is implemented with a Coordinate Rotation Digital Computer (CORDIC).

27. The correlation circuit as defined in claim 23, further comprising an input memory circuit between the digital matched filter and the multiplier circuit, wherein the input memory circuit stores sequences of data from the first and second outputs of the digital matched filter such that after the data has been stored in the input memory circuit, the multiplier circuit can access the data by tap.

28. The correlation circuit as defined in claim 27, wherein the first coherent integration memory and the second coherent integration memory comprise one register per tap.

29. The correlation circuit as defined in claim 23, further comprising:

a magnitude detection circuit adapted to retrieve a first content from the first coherent memory and to retrieve a second content from the second coherent memory, the first content and the second content related to the same tap, the magnitude detection circuit computing a magnitude output predictably related to the magnitude of a vector defined by the first content and the second content; and a non-coherent integration memory adapted to receive and accumulate the magnitude output of the magnitude detection circuit, where the non-coherent integration accumulates the magnitude output with a content of the non-coherent memory at an address of the non-coherent memory related to the tap position and to a frequency of the DFT computation corresponding to the magnitude output.

30. The correlation circuit as defined in claim 23, further comprising a peak detector coupled to the plurality of non-coherent integration memories, the peak detector adapted to retrieve the contents of the non-coherent integration memories, to compare the contents of the non-coherent integration memories to a predetermined threshold, and to provide an indication when at least one content from the contents of the non-coherent integration memories exceeds the predetermined threshold.

31. A method for detecting correlation in a spread spectrum pseudorandom noise receiver, the method comprising:

comparing first and second detected codes to a reference code;

generating a first output and a second output in a digital matched filter, where the first and second outputs are respective summations of comparisons between the first detected code and the reference code and comparisons between the second detected code and the reference code, and where the first output corresponds to a real part of a number and the second output corresponds to an imaginary part of a number;

storing the first and second outputs;

retrieving the first and second outputs in an order such that a series of first and second outputs corresponding to data from a common tap is retrieved;

generating a plurality of products by multiplying the first and second outputs in the complex domain by a plurality of multipliers, where the plurality of multipliers rotate the first and second outputs in a first range in the complex plane;

selecting a product from the plurality of products that corresponds to a phase of a DFT product; and accumulating the plurality of products of the multiplication such that an accumulation of products of multiplies pertaining to a first tap in the digital matched filter is identifiably maintained separately from an accumulation of products of a second tap.

32. The method as defined in claim 31, wherein the multiplying is performed in accordance with a Coordinate Rotation Digital Computer (CORDIC) algorithm.

33. The method as defined in claim 31, where the first range is 90 degrees.

34. The method as defined in claim 31, further comprising:

converting the accumulation of products of the multiplication into a scalar value representing a magnitude of the accumulated product;

accumulating the scalar value with other scalar values, where the scalar value and the other scalar values are related to a time indicated by the first tap in the digital matched filter and to a frequency of a DFT corresponding to the selected product; and storing a result of accumulating the scalar values and the other scalar values in a first collection.

35. The method as defined in claim 34, further comprising:

searching the first collection;

comparing entries in the first collection to a predetermined threshold; and providing an indication when an entry of the first collection is at least as high as the predetermined threshold.

36. A circuit useful for acquiring a pseudorandom noise (PN) code signal, the correlation circuit comprising:

means for comparing a first detected code and second detected code to a reference code and for generating first and second outputs, where the first and second outputs are respective summations of a comparison between the first detected code and the reference code and a comparison between the second detected code and reference code;

means for multiplying a first number defined by the first and second outputs in the complex domain by a second number, where the first output corresponds to a real part of the first number and the second output corresponds to an imaginary part of the first number, where the second number is a term from a DFT computation;

means for converting the product of the multiplication of the first number and the second number into a scalar value representing a magnitude of the product; and means for searching a collection of products, comparing elements of the collection to a predetermined threshold, and providing an indication when an element of the collection is at least as high as the predetermined threshold.

37. The circuit as defined in claim 36, wherein the means for multiplying is a Coordinate Rotation Digital Computer (CORDIC) rotator.

* * * * *